(12) United States Patent
Paul

(10) Patent No.: US 11,037,206 B2
(45) Date of Patent: Jun. 15, 2021

(54) SPONSORED-CONTENT-ITEM STORIES FOR LIVE MEDIA ITEMS

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 414 days.

(21) Appl. No.: 15/855,987

(22) Filed: Dec. 27, 2017

(65) Prior Publication Data

US 2019/0197587 A1 Jun. 27, 2019

(51) Int. Cl.
*G06Q 30/00* (2012.01)
*G06Q 30/02* (2012.01)
*G06Q 50/00* (2012.01)
*H04N 21/81* (2011.01)
*H04N 21/2187* (2011.01)
*H04N 21/4788* (2011.01)

(52) U.S. Cl.
CPC ..... *G06Q 30/0277* (2013.01); *G06Q 30/0246* (2013.01); *G06Q 50/01* (2013.01); *H04N 21/2187* (2013.01); *H04N 21/4788* (2013.01); *H04N 21/812* (2013.01)

(58) Field of Classification Search
CPC .......... G06Q 30/0241; G06Q 30/0277; G06Q 30/0246; G06Q 50/01; H04N 21/2187; H04N 21/812
USPC ........................................................ 705/14
See application file for complete search history.

(56) References Cited

U.S. PATENT DOCUMENTS

| 9,380,353 | B1* | 6/2016 | Ruxton | G06Q 30/0241 |
| 2013/0211910 | A1* | 8/2013 | Yerli | G06Q 30/0251 |
| | | | | 705/14.53 |
| 2013/0263180 | A1* | 10/2013 | Yang | H04N 21/812 |
| | | | | 725/32 |
| 2015/0106841 | A1* | 4/2015 | Wolf | H04N 21/8455 |
| | | | | 725/32 |
| 2015/0326945 | A1* | 11/2015 | Johnson | H04N 21/2187 |
| | | | | 725/32 |
| 2017/0195744 | A1* | 7/2017 | Engel | H04N 21/4825 |
| 2018/0227632 | A1* | 8/2018 | Rubin | H04N 21/44222 |
| 2019/0238908 | A1* | 8/2019 | Lu | H04L 29/06 |

OTHER PUBLICATIONS

Nieman Journalism Lab: Let's Make Live Video We Can Love, 2016 (Year: 2016).*

* cited by examiner

*Primary Examiner* — Matthew L Hamilton
(74) *Attorney, Agent, or Firm* — Baker Botts L.L.P.

(57) ABSTRACT

In one embodiment, a server computing machine provides an interface operable to permit a first user to broadcast a live video to one or more second users. The server computing machine provides sponsored content items to the second users while also providing the live video. In response to receiving an indication that the first user selected an option to display a sponsored content item while broadcasting the live video, the server computing machine reduces the image size of the live video, superimposes the live video of reduced size on the sponsored content item to define a combined image having a sponsored portion on which the sponsored content item is displayed and a live portion on which the live video is displayed. The combined image is then sent to the one or more second users.

18 Claims, 37 Drawing Sheets

SPONSORED-CONTENT-ITEM STORIES FOR LIVE MEDIA ITEMS

PRIORITY

This application claims the benefit, under 35 U.S.C. § 119(e), of U.S. Provisional Patent Application No. 62/455,006, filed 6 Feb. 2017, which is incorporated herein by reference.

TECHNICAL FIELD

This disclosure generally relates to advertisements (also interchangeably referred to herein as sponsored content items) within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a server computing machine may send a media item to a client computing device of a user. The term "media item" as used herein refers to any content item that may be consumed by the user (e.g., a 2D video/photo, a 360-video/photo, an audio file, a slide deck, an interactive content item such as a game, etc.). The media item may be rendered for the user at the client computing device. In particular embodiments, the server computing machine may determine an interest level of the user for the media item. The interest level may be determined based on any number of suitable factors. As an example and not by way of limitation, the interest level may be based on a duration of time for which the media item is played on the client computing device. In particular embodiments, if the interest level of the user is greater than a threshold interest level, the server computing machine may send, to the client computing device, a sponsored-content indicator indicating that a sponsored content item will be presented. As an example and not by way of limitation, the indicator may be a user-interface element that displays a countdown (numerically or graphically) to the time-point at which the sponsored content item will be presented. In particular embodiments, the sponsored content item may be presented on the client computing device (e.g., at the end of a countdown of the indicator).

There are many advantages of not presenting sponsored content items (or indications of their existence) to a user during the playback of media items until it is determined that the user has sufficient interest in the media item (and/or has a sufficient affinity for the sponsored content items). For example, users may tend to be annoyed if they are presented with sponsored content items initially before they have had a chance to discover what the media item has to offer, or before they have gained sufficient interest in the media item. The user may be engaged in a process of discovery, browsing through media items that may be of interest, and subjecting the user to presentations of sponsored content items at this stage may contribute to a negative user experience. Even the knowledge that a media item contains a number of sponsored content items before this point may be annoying to users. As a result, users may be dissuaded from engaging with media items, causing them to miss content that they may otherwise have found valuable. In the aggregate, there may be a significant decrease in media-item consumption, which may be a net loss for users interested in consuming media items, content creators/publishers, content-hosting platforms, and sponsoring entities or users. By waiting until it is determined that a user is interested in the media item before presenting sponsored content items or indicators of sponsored content items, consumption of media items may be encouraged. Additionally, by waiting until the user is sufficiently interested in the media item, it may be more likely that the user stays interested enough to consume the sponsored content item and also continue with the media item past the presentation of the sponsored content item. The methods described herein cause sponsored content items (and indicators of the presence and locations of those sponsored content items) to not be presented to a user accessing a media item until it has been determined that the user is sufficiently interested in the media item. As will be described, one method of causing sponsored content items to not be presented involves preventing or suppressing the transmission of sponsored content items. Several technical advantages are contemplated by not sending sponsored content items until a sufficient interest level is determined. As an example and not by way of limitation, there may be savings in network bandwidth usage, server-side processing power involved in transmitting the sponsored content item, client-side processing power involved in loading or rendering the sponsored content item, and there may be a perceptible decrease in the amount of time it takes to load media items. These advantages may result from fewer sponsored content items being sent, loaded, and rendered per media item. As an example and not by way of limitation, for media items that the user is not sufficiently interested in such that the user would just scroll away rather than pay attention to a sponsored content item, the sponsored content item may not be sent.

In particular embodiments, a server computing machine (e.g., a social-networking system) may render a feed (e.g., a newsfeed) of an online social network on a client computing device (e.g., a client system). The newsfeed of the online social network may include a plurality of media items. In particular embodiments, a media item may be either a pre-recorded or pre-generated media item (e.g., a pre-recorded video) or may be a live-stream (e.g., a live-streaming video). The media items may be arranged from top to bottom in the newsfeed and may be accessed by transitioning (e.g., scrolling) through the newsfeed. The user may view a media item on his client computing device. When the user has viewed the media item for a certain duration of time, the server computing machine may send a sponsored content item (e.g., a video advertisement, a commercial, etc.) for display on the client computing device. The user may continue to watch the sponsored content item or transition (e.g., scroll up/down) to watch another media item in the newsfeed. When the user decides to watch another media item, the server computing machine may pause the sponsored content item from playing. The server computing machine may resume the playback of the paused sponsored content item when the user returns to view the media item with which the sponsored content item is associated. The server computing machine may resume the playback from the same time from where the user left off. For example, if the user left off watching a commercial at the tenth second, then the server computing machine may resume the playback from the tenth second of the commercial.

In particular embodiments, a server computing machine (e.g., a social-networking system) may provide an interface operable to permit a first user to broadcast a live video to one or more client systems (or client computing devices) of one or more second users. In response to receiving an indication that the first user, while broadcasting the live video, selected an option within the interface to display a sponsored content item, the server computing machine may start loading the sponsored content item to the one or more client systems while the broadcasting of live video is still ongoing. While loading the sponsored content item to the one or more client systems of one or more second users, the server computing machine may inform the first user (such as via the interface) that loading of the sponsored content item is ongoing even while the broadcast of the live video is active. After loading the sponsored content item to the one or more client systems, the server computing machine may inform the one or more second users that the sponsored content item will soon be displayed.

In particular embodiments, a server computing machine (e.g., a social-networking system) may provide an interface operable to permit a first user to broadcast a live video to one or more second users. In response to the server computing machine receiving an indication that the first user selected an option within the interface to display a sponsored content item while broadcasting the live video, the server computing machine may reduce the image size of the live video, and superimpose the live video of reduced size on the sponsored content item to define a combined image. The combined image may have a sponsored portion on which the sponsored content item is displayed and a live portion on which the live video of reduced size is displayed. The server computing machine may then send the combined image for display to the one or more second users, by which the second users may simultaneously receive the sponsored content item and the broadcast of the live video.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
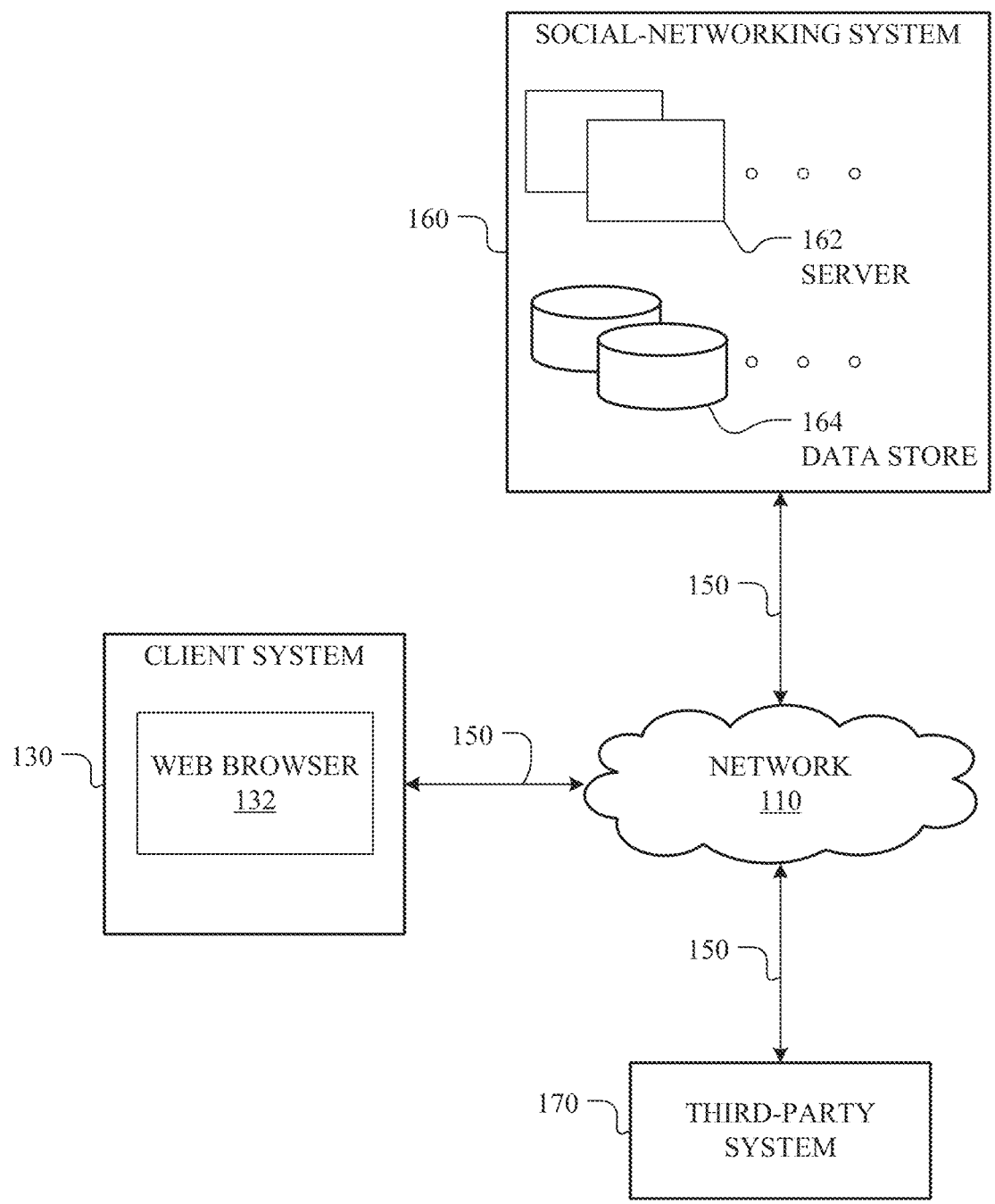
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
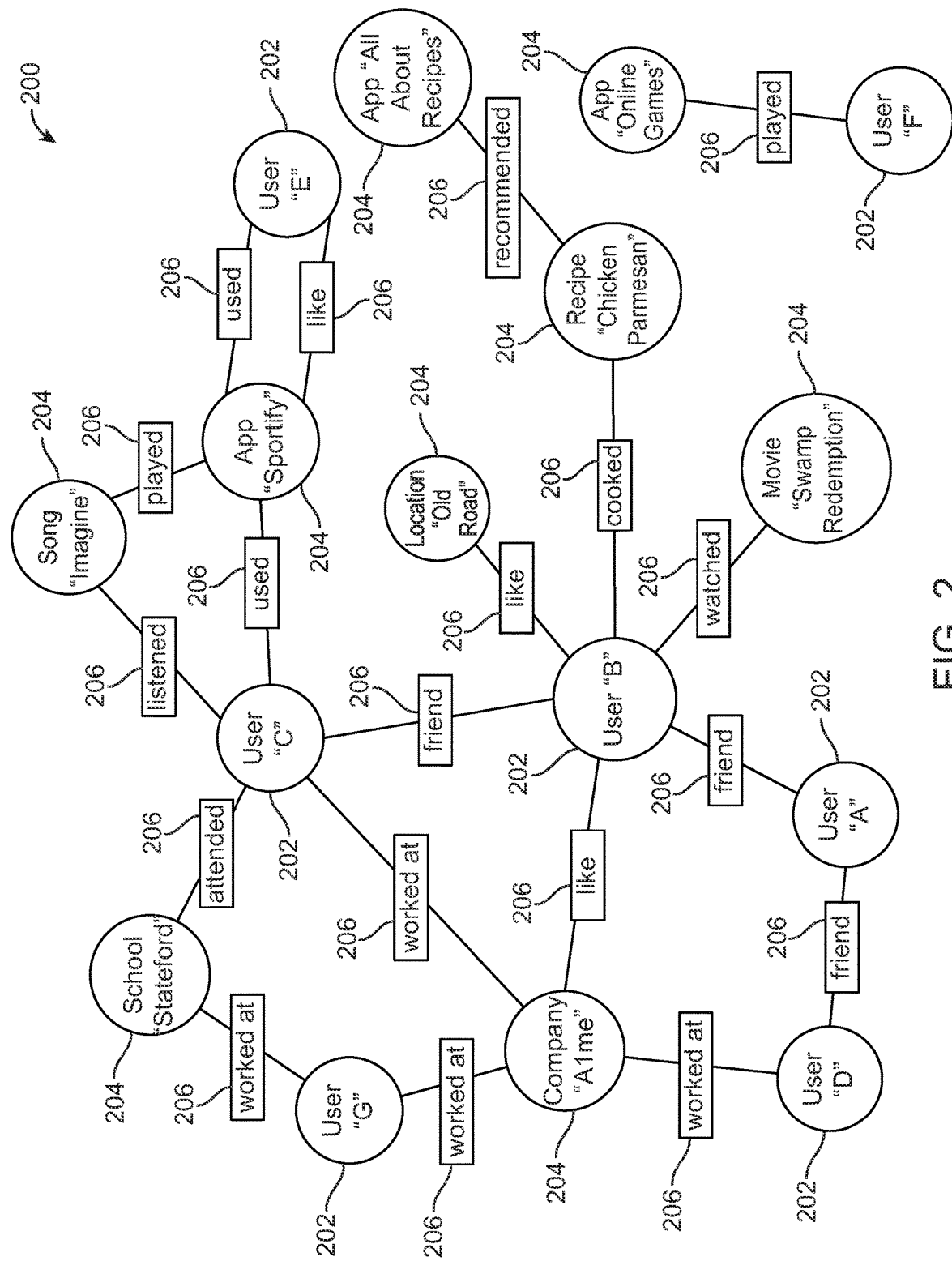
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a web site (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204).

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Indications for Sponsored Content Items within Media Items

FIGS. 3A-3E illustrate example interfaces of an online social network in which a media item is rendered and sponsored content items are presented. Such interfaces may be displayed using any appropriate client system 130 (e.g., a smartphone, a desktop computer, etc.). Sponsored content items may be presented in the interface at some point during the playback of a media item. For example, fifteen seconds after continued playback of the media item, the interface may transition from the media item to a sponsored content item that may be presented within the same region of the interface. In this example, the interface may again transition back to the media item after a period of time (e.g., when the presentation of the sponsored content item has finished). Before the sponsored content item is presented, a sponsored-content indicator may be presented, for example, to indicate to a user of the client system 130 that the presentation of a sponsored content item is imminent (e.g., by way of a sponsored-content indicator that includes a countdown timer). At least in some instances, the sponsored-content indicator may not be presented until it is determined that the user has sufficient interest in the media item (and/or has a sufficient affinity for the sponsored content items). Similarly, the sponsored content item itself may not be presented until it is determined that the user has sufficient interest.

There are many advantages of not presenting sponsored content items (or indications of their existence) to a user during the playback of media items until it is determined that the user has sufficient interest in the media item (and/or has a sufficient affinity for the sponsored content items). For example, users may tend to be annoyed if they are presented with sponsored content items initially before they have had a chance to discover what the media item has to offer, or before they have gained sufficient interest in the media item. The user may be engaged in a process of discovery, browsing through media items that may be of interest, and subjecting the user to presentations of sponsored content items at this stage may contribute to a negative user experience. Even the knowledge that a media item contains a number of sponsored content items before this point may be annoying to users. As a result, users may be dissuaded from engaging with media items, causing them to miss content that they may otherwise have found valuable. In the aggregate, there may be a significant decrease in media-item consumption, which may be a net loss for users interested in consuming media items, content creators/publishers, content-hosting platforms, and sponsoring entities or users. By waiting until it is determined that a user is interested in the media item before presenting sponsored content items or indicators of sponsored content items, consumption of media items may be encouraged. Additionally, by waiting until the user is sufficiently interested in the media item, it may be more likely that the user stays interested enough to consume the sponsored content item and also continue with the media item past the presentation of the sponsored content item. The methods described herein cause sponsored content items (and indicators of the presence and locations of those sponsored content items) to not be presented to a user accessing a media item until it has been determined that the user is sufficiently interested in the media item. As will be described, one method of causing sponsored content items to not be presented involves preventing or suppressing the transmission of sponsored content items. Several technical advantages are contemplated by not sending sponsored content items until a sufficient interest level is determined. As an example and not by way of limitation, there may be savings in network bandwidth usage, server-side processing power involved in transmitting the sponsored content item, client-side processing power involved in loading or rendering the sponsored content item, and there may be a perceptible decrease in the amount of time it takes to load media items. These advantages may result from fewer sponsored content items being sent, loaded, and rendered per media item. As an example and not by way of limitation, for media items that the user is not sufficiently interested in such that the user would just scroll away rather than pay attention to a sponsored content item, the sponsored content item may not be sent.

In particular embodiments, a server computing machine may send a media item to a client computing device of a user. The term "media item" as used herein refers to any content item that may be consumed by the user (e.g., a 2D video/photo, a 360-video/photo, an audio file, a slide deck, an interactive content item such as a game, etc.). The media item may be rendered for the user at the client computing device. In particular embodiments, the server computing machine may determine an interest level of the user for the media item. The interest level may be determined based on any number of suitable factors. As an example and not by way of limitation, the interest level may be based on a duration of time for which the media item is played on the client computing device. In particular embodiments, if the interest level of the user is greater than a threshold interest level, the server computing machine may send, to the client computing device, a sponsored-content indicator indicating that a sponsored content item will be presented. As an example and not by way of limitation, the sponsored-content indicator may be a user-interface element that displays a countdown (numerically or graphically) to the time-point at which the sponsored content item will be presented. In particular embodiments, the sponsored content item may be presented on the client computing device (e.g., at the end of a countdown of the sponsored-content indicator).

Figure 3A:
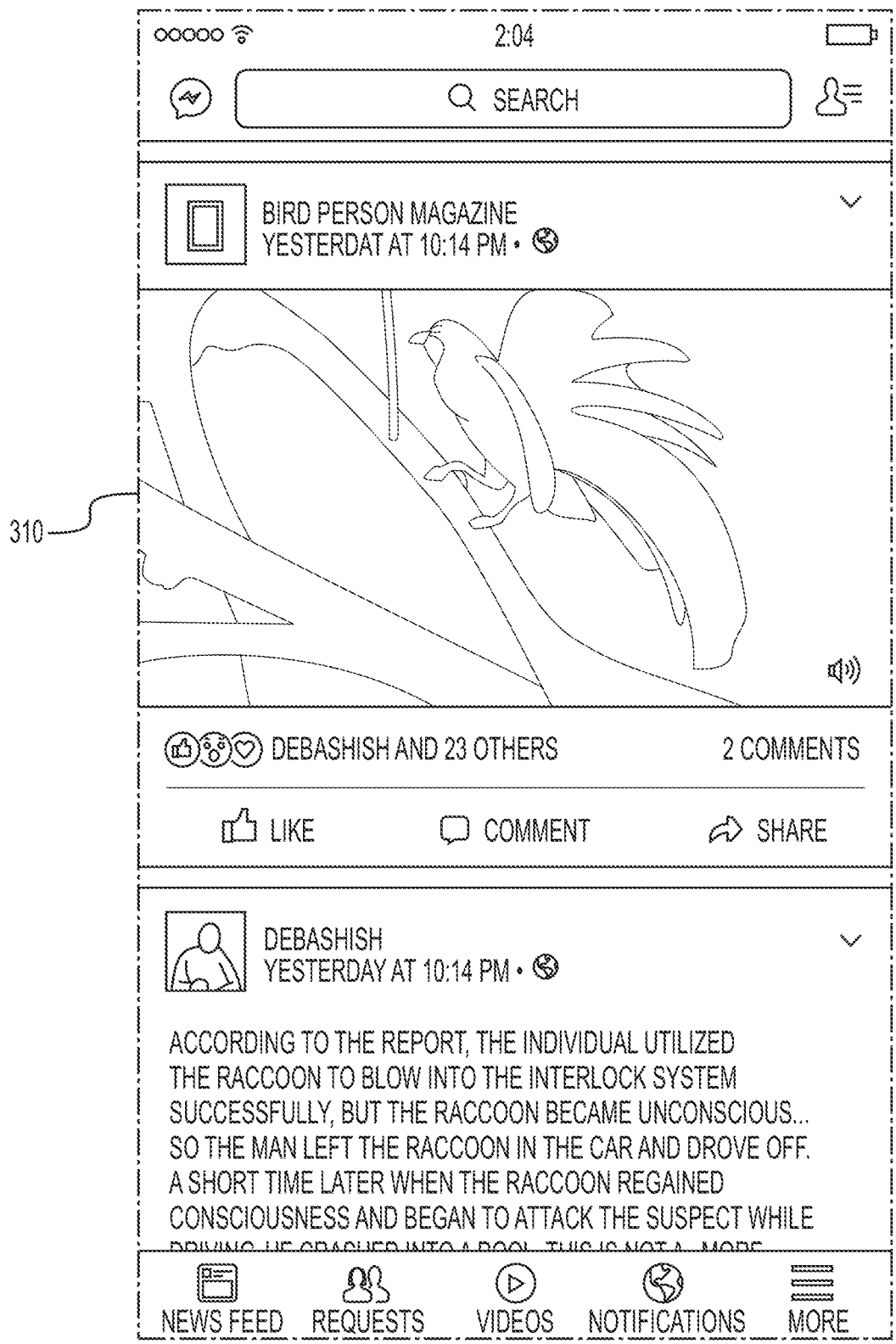
FIG. 3A illustrates an example interface of an online social network within which a media item is rendered.

In particular embodiments, a server computing machine (or any other suitable computing device or system) may send a media item to a client computing device of a user. In particular embodiments, the server computing machine may be a social-networking system 160 or any suitable media-hosting or -distribution system. In particular embodiments, the media item may be either a pre-recorded or pre-generated media item (e.g., a pre-recorded video) or may be a live-stream (e.g., a live-streaming video). The media item may be rendered for the user at the client computing device. As an example and not by way of limitation, the media item may be sent to the client computing device to be rendered within an interface of an online social network associated with the server computing machine (e.g., the social-networking system 160). The client computing device may then render the media item. FIG. 3A illustrates an example interface of an online social network within which a media item is rendered. Referencing FIG. 3A, the media item 310 (e.g., a video) may be presented within a newsfeed of an online social network, and may be sent as the user navigates through the newsfeed. Alternatively, the media item 310 may be sent in response to a user input indicating an intent to access the media item 310. As an example and not by way of limitation, the media item 310 may be sent only when the user selects a thumbnail or other representation of the media item 310. In particular embodiments, the media item 310 may have been uploaded to the server computing machine by a third-party system. As an example and not by way of limitation, the third-party system may be a client computing system associated with another user of the online social network. As another example and not by way of limitation, the third-party system may be a content creator/publisher (e.g., referencing FIG. 3A, the content creator/publisher "Bird Person Magazine").

In particular embodiments, the server computing machine may determine an interest level of the user for the media item. The interest level may be determined based on any number of suitable factors. In particular embodiments, the interest level may be based on a duration of time for which the media item is played (e.g., viewed, heard, or otherwise engaged with by the user) on the client computing device. As an example and not by way of limitation, the interest level of the user for an audio file (e.g., a podcast) may be based on an aggregate amount of playtime of the audio file by the user. In this example, if a user skips around the audio file playing segments of the audio file, the interest level may be based on the combined durations of the individual segments. As another example and not by way of limitation, the interest level may be based on an amount of continuous playtime of the audio file. In this example, only the duration of the largest played segment may be counted for determining the interest level. As another example and not by way of limitation, the interest level may be based on a percentage of the audio file that has been played. In this example, for a relatively large audio file, all else equal, a larger segment of the audio file may need to be played to reach the same interest level as in the case of a relatively small audio file. The duration of time a media item is played may be relevant to determining the interest level of the user for any of several reasons. As an example and not by way of limitation, the very fact that a user spent a relatively long amount of time engaging with a media item may suggest that the user is interested in the media item. As another example and not by way of limitation, the sunk cost involved with playing a media item for a duration of time may suggest that the user will be inclined to continue with the media item (e.g., even after a sponsored content item is presented). As another example and not by way of limitation, the amount of time remaining for the media item (e.g., as may be reflected by the percentage of the media item that has already been played) may indicate that the user is sufficiently invested in the media item to continue with the media item.

In particular embodiments, the interest level may be determined based on historical usage patterns of the user with respect to previous presentations of sponsored content items within media items. Such historical usage patterns may include information about how the user behaved when presented with sponsored content items in the past. As an example and not by way of limitation, the historical usage patterns may include information about how frequently the user scrolled away from or stopped playing a media item when a sponsored content item was presented. As another example and not by way of limitation, the historical usage patterns may include information correlating user behavior with the timing of the presentation of sponsored content items. For example, a user may frequently have stopped playing a video when a sponsored content item was presented five seconds into the video, but may have tended to continue with the video (after the presentation of the sponsored content item) if the sponsored content item was presented ten seconds into the video. In particular embodiments, the server computing machine may also correlate the user's behavior when presented with sponsored content items with information about the specific media items for which the sponsored content items were presented. As an example and not by way of limitation, if a user has demonstrated a tendency to continue listening to audio files of podcasts about politics (or podcasts by specific content creators/publishers) after sponsored content items are presented, the user may be determined to have a higher interest level than otherwise in a similar audio file.

In particular embodiments, the interest level may be determined based on one or more topics associated with the media item. The topics may, for example, correspond to concept or user nodes of a social graph (e.g., referencing FIG. 2, the social graph 200 of the social-networking system 160). Topics may be associated with a media item based on information associated with the media item (based on, for example, text of titles or descriptions entered by the creator/publisher of the media item; text of comments, reshares, or posts on an online social network associated with the media item; speech or sound analysis; visual-recognition techniques, etc.). More information about how topics may be associated with media items may be found in the following applications, which are incorporated herein by reference: U.S. patent application Ser. No. 13/167,701, filed 23 Jun. 2011; U.S. patent application Ser. No. 14/585,782, filed 30 Dec. 2014; U.S. patent application Ser. No. 14/952,707, filed 25 Nov. 2015; U.S. patent application Ser. No. 13/959,446, filed 5 Aug. 2013, and U.S. patent application Ser. No. 14/983,385, filed 29 Dec. 2015; and U.S. patent application Ser. No. 15/277,938, filed 27 Sep. 2016. The interest level of a particular user for a particular media item may be determined by calculating an affinity of the user for topics that are associated with the particular media item (which may be determined, for example, based on a degree of separation between a node corresponding to the user and a node corresponding to the media item on a social graph, or based on any other suitable social graph information). As an example and not by way of limitation, a particular user may be determined to have a high affinity for the topic "Cooking" (e.g., as determined by the particular user's history of watching videos related to cooking, liking posts or pages related to cooking recipes, etc.), in which case, the particular user may be determined to have a interest level for an interactive cooking tutorial. In particular embodiments, the interest level may be determined based on demographical information of the user. All else equal, users of a particular demographic (e.g., an age group) may share traits that make them more interested in a particular media item than another demographic. This may be determined based on any suitable study, such as correlational analyses of historical usage by users of the particular demographic (e.g., users of an online social network) with respect to the particular media item, related media items, or other media items with the same or similar topic. As an example and not by way of limitation, all else equal, users in the Millennials (or Generation Y) demographic may have a higher interest level for a media item associated with the topic "1990s Music Hits" than users in the Generation X demographic (e.g., because Millenials may have a higher affinity for music from the 90s). As another example and not by way of limitation, all else equal, users in a French-speaking demographic may have a higher interest level for a media item that is in the French language than other users.

In particular embodiments, if the interest level of the user is greater than a threshold interest level, the server computing machine may send, to the client computing device, a sponsored-content indicator indicating that a sponsored content item will be presented. As an example and not by way of limitation, the sponsored-content indicator may be a user-interface element that displays a countdown (numerically or graphically) to the time-point at which the sponsored content item will be presented. The sponsored-content indicator may be rendered at any suitable location on a display of the client computing device (e.g., overlaying a region that is occupied by the media item, adjacent to the region, at a specified location on the display, etc.).

Figure 3B:
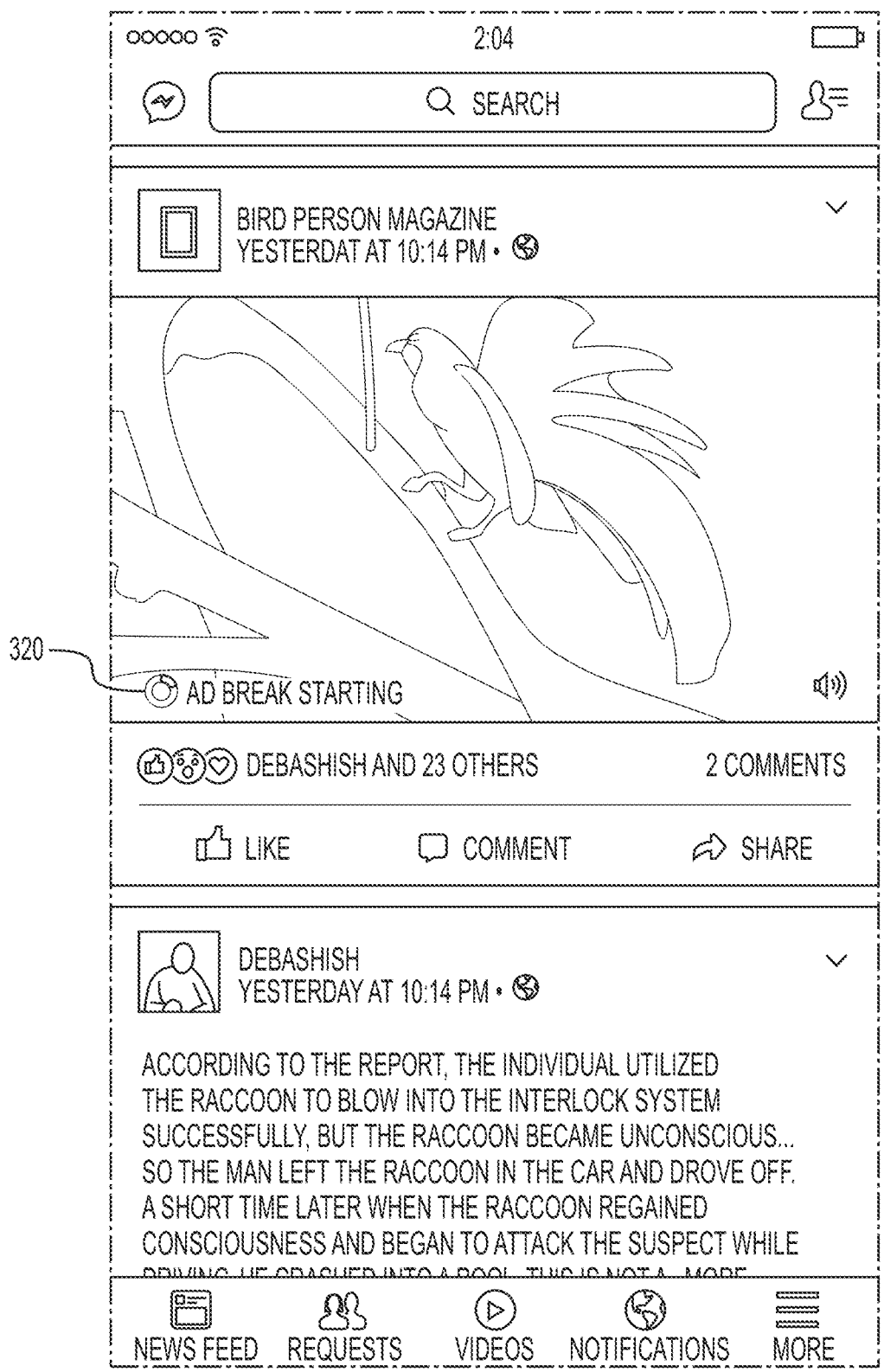
FIGS. 3B-3C illustrate example interfaces of an online social network in which a sponsored-content indicator is rendered.
Figure 3C:
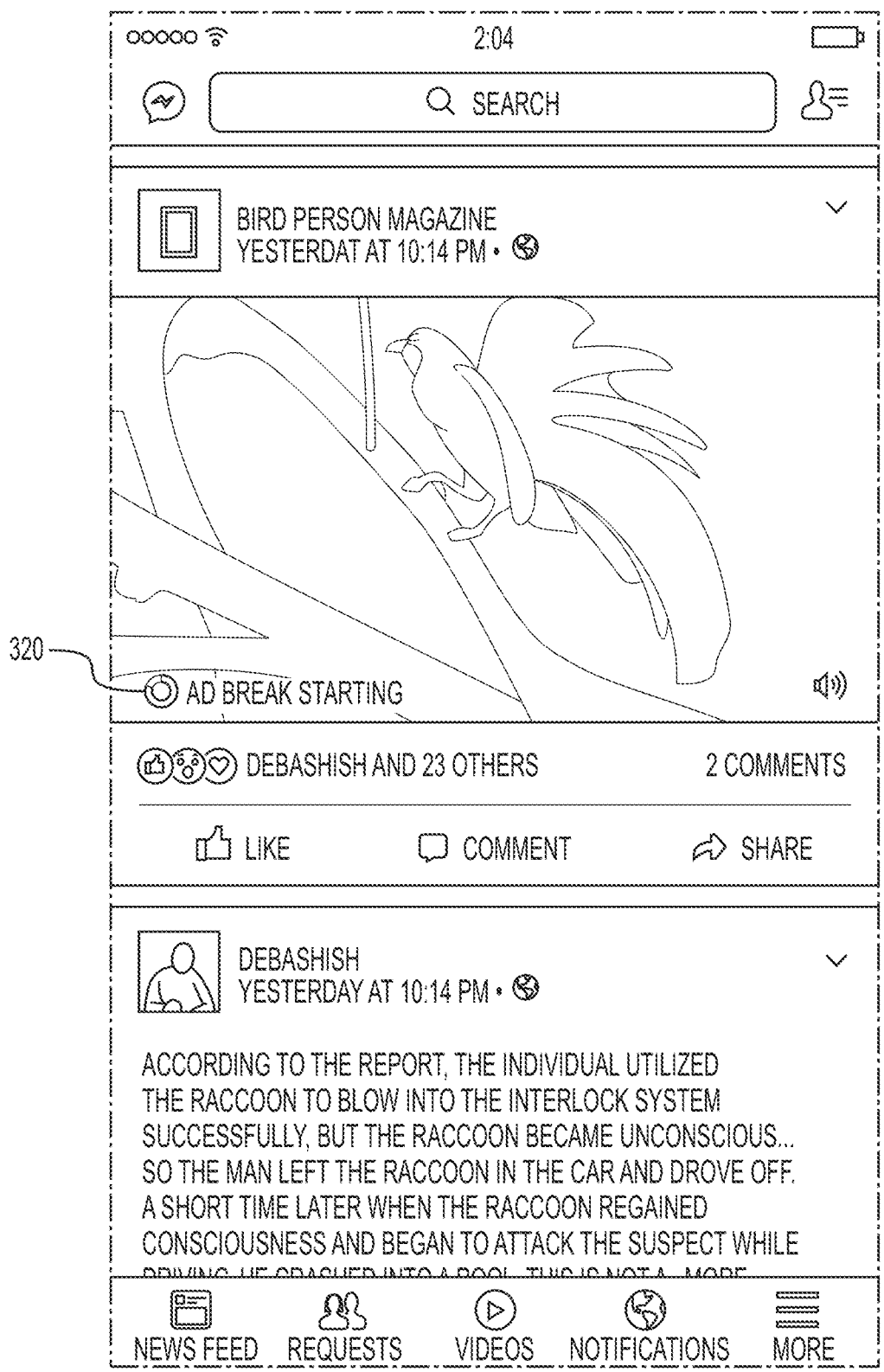

FIGS. 3B-3C illustrate example interfaces of an online social network in which a sponsored-content indicator 320 is rendered. In particular embodiments, until the interest level is determined to be greater than the threshold interest level, there may not be any indication to the user of an upcoming presentation of a sponsored content item. There may be several advantages to not presenting indications of sponsored content items initially. As an example and not by way of limitation, indications of sponsored content items tend to be annoying or frustrating for users who have not yet had the opportunity to experience or derive sufficient value from the media item. For example, a user may be annoyed by learning that a video may contain five instances of sponsored content items, and may even be dissuaded from accessing the video. As another example and not by way of limitation, presenting indications of sponsored content items (e.g., when the indications indicate specific time-points at which sponsored content items will be presented) may tend to cause users to take actions for skipping the sponsored content items. For example, a video may include a timeline that indicates points at which sponsored content items are to be presented, in which case a user watching the video may attempt to skip over the sponsored content items, or skip portions of the video that have high concentrations of sponsored content items to minimize the number of sponsored content items presented. Such attempts may result in a negative user experience for the user as the user may skip over important portions of the media item, and may additionally reduce the effectiveness of sponsored content items. The interest level of the user in a media item may be relevant to the decision of whether to finally present an indication of sponsored content, because a high interest may, for example, suggest that the user is sufficiently interested in the media item to be willing to consume the sponsored content item (e.g., so that the user can finish the rest of the media item after the sponsored content item has been presented). Presenting an indication of the sponsored content item before it is determined that a user has a sufficient interest level in the media item may diminish the user's interest in the media item and may dissuade the user from even engaging with the media item. In the aggregate, there may be a significant decrease in the consumption of media items. The result may be a net loss for the user, the content creator/publisher, the content-hosting platform, and the sponsoring entity or user, because a potentially interested user may not access a media item that the user may otherwise have wanted to access.

Figure 3D:
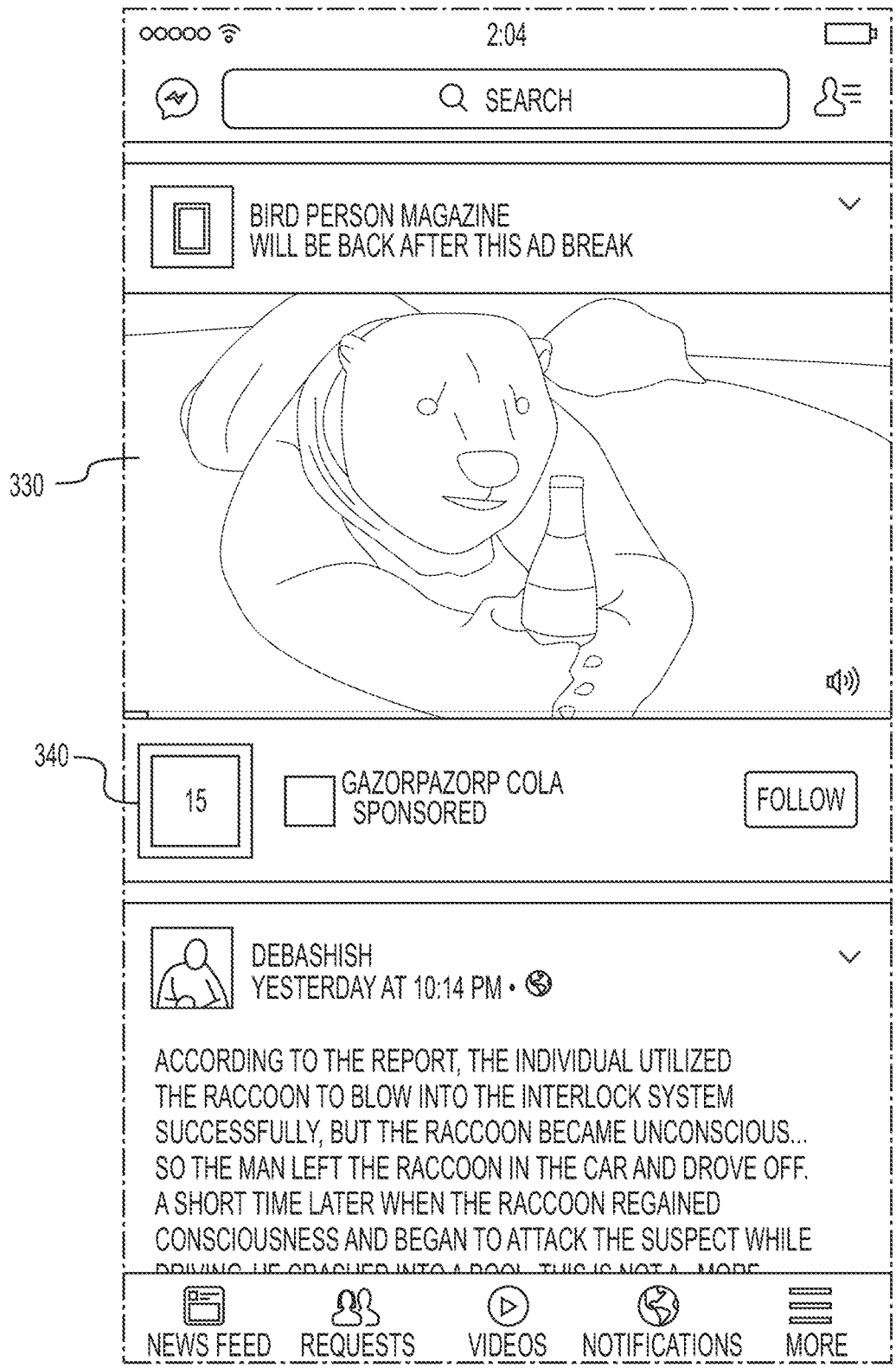
FIGS. 3D-3E illustrate example interfaces of an online social network within which a sponsored content item is presented.
Figure 3E:
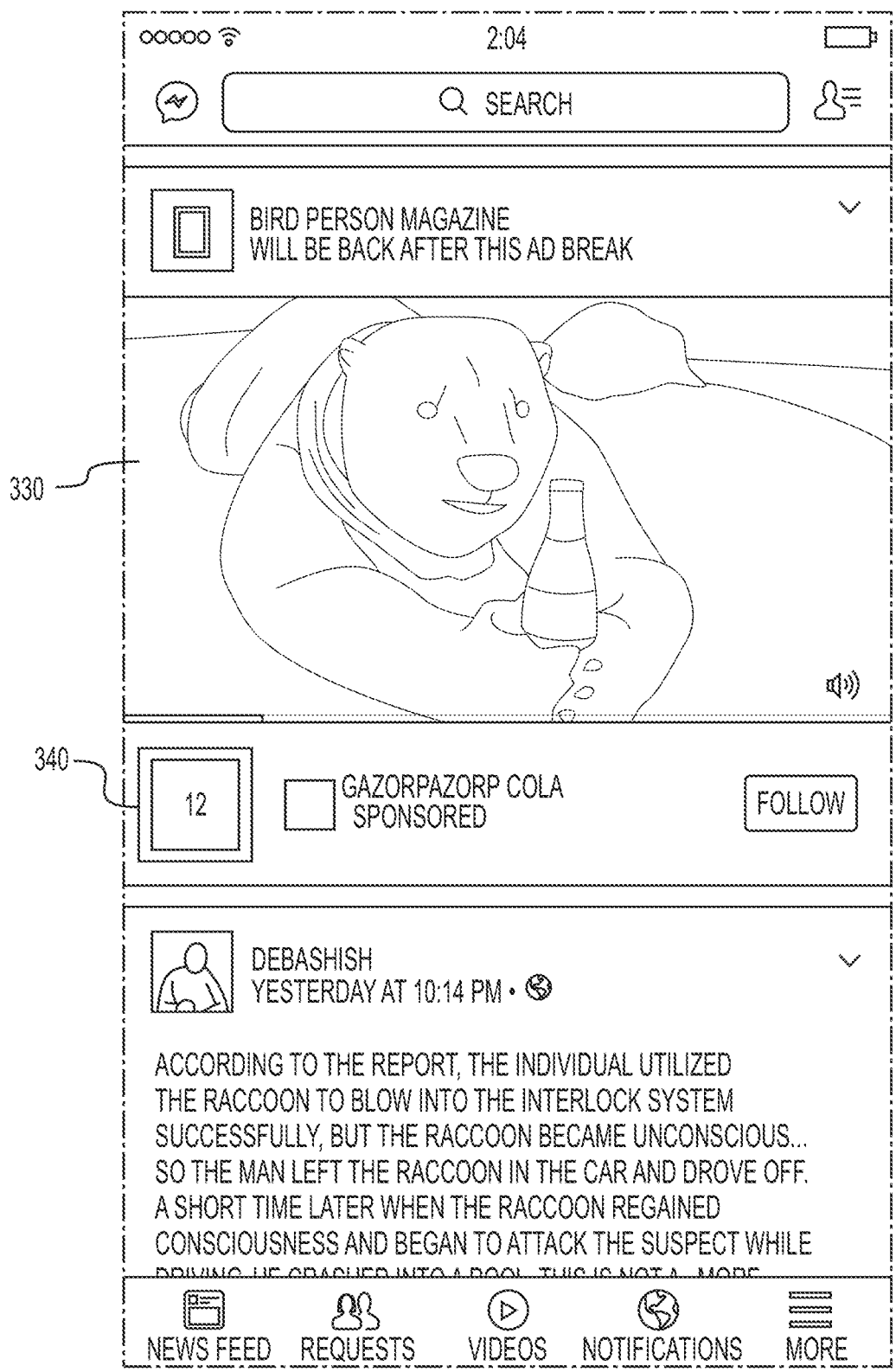

In particular embodiments, the sponsored content item may be presented on the client computing device (e.g., at the end of a countdown of the sponsored-content indicator 320). FIGS. 3D-3E illustrate example interfaces of an online social network within which a sponsored content item is presented. As used herein, the term "sponsored content item" may refer to any type of content item (e.g., a media item such as a video, an audio file, a photo, an interactive item) that is sponsored by a user or other entity. In particular embodiments, the sponsored content item may be a "direct-response" item that includes a call to action (e.g., a video that includes interactive elements that may be activated by the user to submit an input to a user or entity associated with the sponsored content item). Alternatively, the sponsored content item may be a "non-direct-response" item, or what may be characterized as a passive content item (e.g., a video without any input options). Referencing FIG. 3D, the sponsored content item 330 may be sponsored by the entity "Gazorpazorp Cola." In particular embodiments, the server computing machine may cause the sponsored content item to be presented by instructing the client computing device to play the sponsored content item. As an example and not by way of limitation, the sponsored content item may have been sent previously (e.g., along with the media item), in which case, the client system may simply retrieve the sponsored content item from local storage. As another example and not by way of limitation, the server computing machine may send the sponsored content item to the client computing device at a suitable time after the threshold interest level has been reached (e.g., immediately after the threshold interest level has been reached, when the sponsored-content indicator is first displayed, a minimum period of time before the sponsored content is to be presented, continuously streaming portions of the sponsored content item as it is being rendered, etc.).

In particular embodiments, the server computing machine may suppress the sending of a sponsored content item if the user has been presented with, seen, or engaged with another sponsored content item within a specified period of time. As an example and not by way of limitation, if the user has watched a sponsored content item sometime within the past five minutes, the server computing machine may suppress the sending of an additional sponsored content item (e.g., at least until the five-minute period has been exceeded). In particular embodiments, the period of time may be specified by the server computing machine. The period of time may be personalized for the user (e.g., based on location, the day, the time, information about the user, etc.). As an example and not by way of limitation, the period of time may be longer in the afternoon during the workweek, when users may have limited time for sponsored content items, than at night on a weekend, when users may have more time. As another example and not by way of limitation, the period of time may be shortened for users who have indicated a preference for sponsored content items (e.g., users who have clicked on links associated with sponsored content items, users who have interacted meaningfully with direct-response sponsored content items). The period of time may also depend on the sponsored content item that was presented previously or the sponsored content item that is to be presented. As an example and not by way of limitation, a shorter period of time may be specified if the previously presented sponsored content item (or the sponsored content item that is to be presented) was a relatively non-intrusive content item (e.g., a questionnaire or a banner that does not interfere with playback of a media item). As another example and not by way of limitation, a shorter period of time may be specified if the previously presented sponsored content item (or the sponsored content item that is to be presented) was relatively short (e.g., a five-second clip).

In particular embodiments, the sponsored content item (or the sponsored-content indicator such as the sponsored-content indicator 320) may be presented at one of a plurality of potential sponsor points in the media item. As an example and not by way of limitation, a particular video may have three different potential sponsor points at different time-points in the video—s1, s2, and s3. In this example, if the threshold interest level is reached at a time-point between s1 and s2, a sponsored-content indicator may be shown for the countdown period before s2, and a sponsored content item may be presented at s2. In particular embodiments, these potential sponsor points may be pre-determined. As an example and not by way of limitation, an algorithm of a media-hosting platform (e.g., an online social network) may determine them when the media item is uploaded or before the media item is sent to the client computing device. For example, the algorithm may place the potential sponsor points before scene changes, at natural break points, after points the media item that are of interest (e.g., cliffhangers), points of user engagement (e.g., points in a video where a large number of users submitted "likes," comments, or other reactions), simply based on equal partitions of time, or any suitable combination of these methods. As another example and not by way of limitation, the content creator/publisher or the sponsoring entity may specify the potential sponsor points. In particular embodiments, the potential sponsor points may be determined dynamically. As an example and not by way of limitation, a set of potential sponsor points may be determined following and based on the time-point at which the threshold interest level was reached (e.g., the first of the set of potential sponsor points occurring five seconds after this time-point).

Referencing FIGS. 3A-3E, an example use case will now be described. A user may be using a client computing device to scroll through a newsfeed on an interface of an online social network associated with the social-networking system 160. Referencing FIG. 3A, the user may scroll to a point in the newsfeed where the video 310 appears. By this point the social-networking system 160 may have sent at least a portion of the video to the client computing device of the user. Playback of the video 310 may be initiated. Referencing FIG. 3B, the video may have played for a certain duration, at which point the threshold interest level may have been exceeded (e.g., based on the duration of time in combination with historical usage information associated with the user). As a result, the sponsored-content indicator 320 may be presented. The sponsored-content indicator 320 may provide a suitable description indicating to the user that a sponsored content item is imminent, and may also include an element that indicates a measure of time remaining before the sponsored content item is presented. As an example and not by way of limitation, in the sponsored-content indicator 320, a clock-like countdown timer element may be presented. As made evident by comparing FIG. 3B and FIG. 3C (the latter being later in time), the clock-like countdown timer element graphically illustrates a countdown of the remaining time until a sponsored content item is to be displayed. Referencing FIG. 3D, when the countdown is completed, the sponsored content item 330 (e.g., a video) may be displayed on the client computing device. The sponsored content item 330 may be streamed to the client computing device as it plays or may have been sent prior to it being played (e.g., with all or at least a portion of the sponsored content item 330 being sent when the sponsored-content indicator 320 was first displayed). As the sponsored content item 330 is being presented, the returning-content indicator 340 may be displayed. The example returning-content indicator 340 in FIGS. 3D-E displays a numerical countdown indicating an amount of time remaining before the video 310 is resumed. The end of the countdown may or may not correspond to the end of the presentation of the sponsored content item (e.g., it may be countdown to a point at which the user may be able to skip the rest of the presentation). At the end of the countdown, the video 310 may be resumed automatically or in response to a user input indicating an intent to resume the video 310.

In particular embodiments, if the interest level of the user for the media item never reaches a point greater than the threshold interest level, a sponsored-content indicator may never be sent to the client computing device of the user during playback of the media item. Correspondingly, the server computing machine may cause the sponsored content item to not be presented during playback of the media item (i.e., it may forgo presentation of the sponsored content item). As an example and not by way of limitation, the server computing machine may not send the media item to the client computing device for playback. As another example and not by way of limitation, the server computing machine may send all or a portion of the media item to the client computing device, but may instruct the client computing device to not present the sponsored content item.

In particular embodiments, the server computing machine may determine an affinity level of the user for the sponsored content item. In particular embodiments, the affinity level of the user for the sponsored content item may be a measure of an affinity the user has for the sponsored content item, for the one or more users or entities who sponsored the sponsored content item, or for other or more users or entities associated with the sponsored content item (e.g., users who liked the sponsored content item). In particular embodiments, the affinity level may be based on a measure of affinity the user has for a content-type of the sponsored content item. As an example and not by way of limitation, the user may have a relatively high affinity for sponsored content items (or media items generally) that are games, in which case, the affinity level of such a sponsored content item may be higher than otherwise. In particular embodiments, the affinity level of the user may be determined based on a number of degrees of separation between the first node and a second node associated with the sponsored content item. In particular embodiments, the interest level of the user may be adjusted upward or downward based on the determined affinity level. As an example and not by way of limitation, if the user has an affinity level that is greater than a threshold affinity level, the interest level of the user may be adjusted upward. For example, referencing FIG. 3D, if the user has a relatively high affinity level for Gazorpazorp Cola (e.g., the user may have previously liked content by Gazorpazorp Cola or a page associated with Gazorpazorp Cola), the interest level for the media item may be adjusted upward. As another example and not by way of limitation, if the user has an affinity level that is below a minimum affinity level (e.g., if the user has previously indicated a dislike for content by Gazorpazorp Cola), the interest level of the user may be adjusted downward. In particular embodiments, the amount of adjustment may be based on the amount by which the affinity level exceeds the threshold affinity level or by which the affinity level is below the minimum affinity level. In particular embodiments, the server computing machine may consider the user's affinity level for all potential sponsored content items when adjusting the interest level. As an example and not by way of limitation, there may be five potential sponsored content items for a given media item, in which case, the server computing machine may look at affinity levels for all five sponsored content items. In this example, the server computing machine may base its adjustment of the interest level on the affinity level of the sponsored content item with the highest affinity level (and may select that particular sponsored content item for presenting to the user). In particular embodiments, the affinity level for a particular sponsored content item may be adjusted downward based on the user's previous interactions with the particular sponsored content item, or a related sponsored content item. As an example and not by way of limitation, if the user has already seen the particular sponsored content item with the last five hours, the affinity level for particular sponsored content item (or other sponsored content items by the same sponsoring entity or user) may be adjusted downward. As another example and not by way of limitation, if the user previously indicated a lack of interest in the particular sponsored content item (or other sponsored content items by the same sponsoring entity or user) by scrolling away from it or submitting an input to hide the sponsored content item, the affinity level of the particular sponsored content item may be adjusted downward. In particular embodiments, the affinity level may not be a measure for simply adjusting the interest level of the user, but may be an additional and independent factor in determining whether it is time to present a sponsored content item.

Figure 4A:
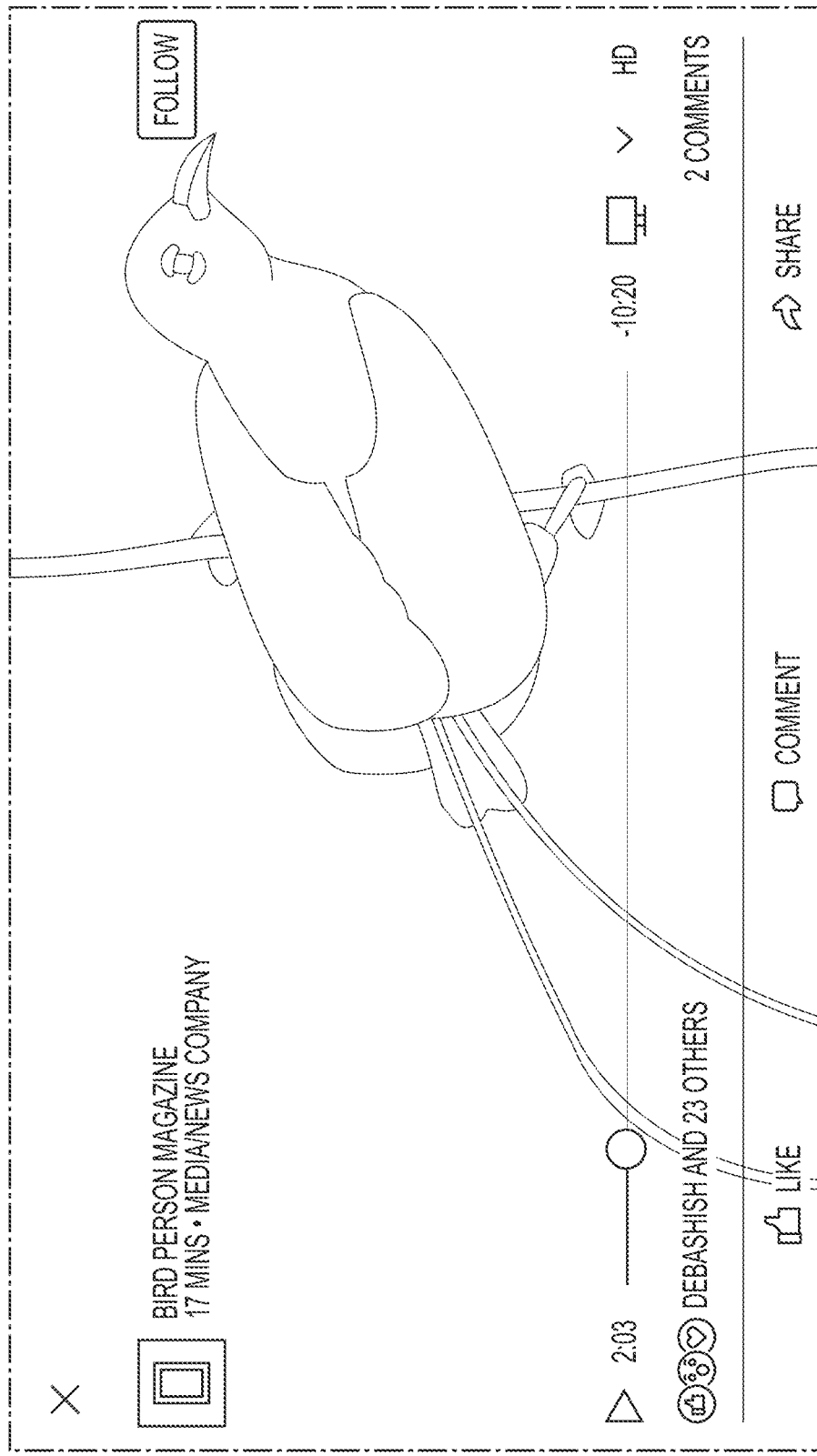
FIG. 4A illustrates an example of a full-screen display of a media item.
Figure 4B:
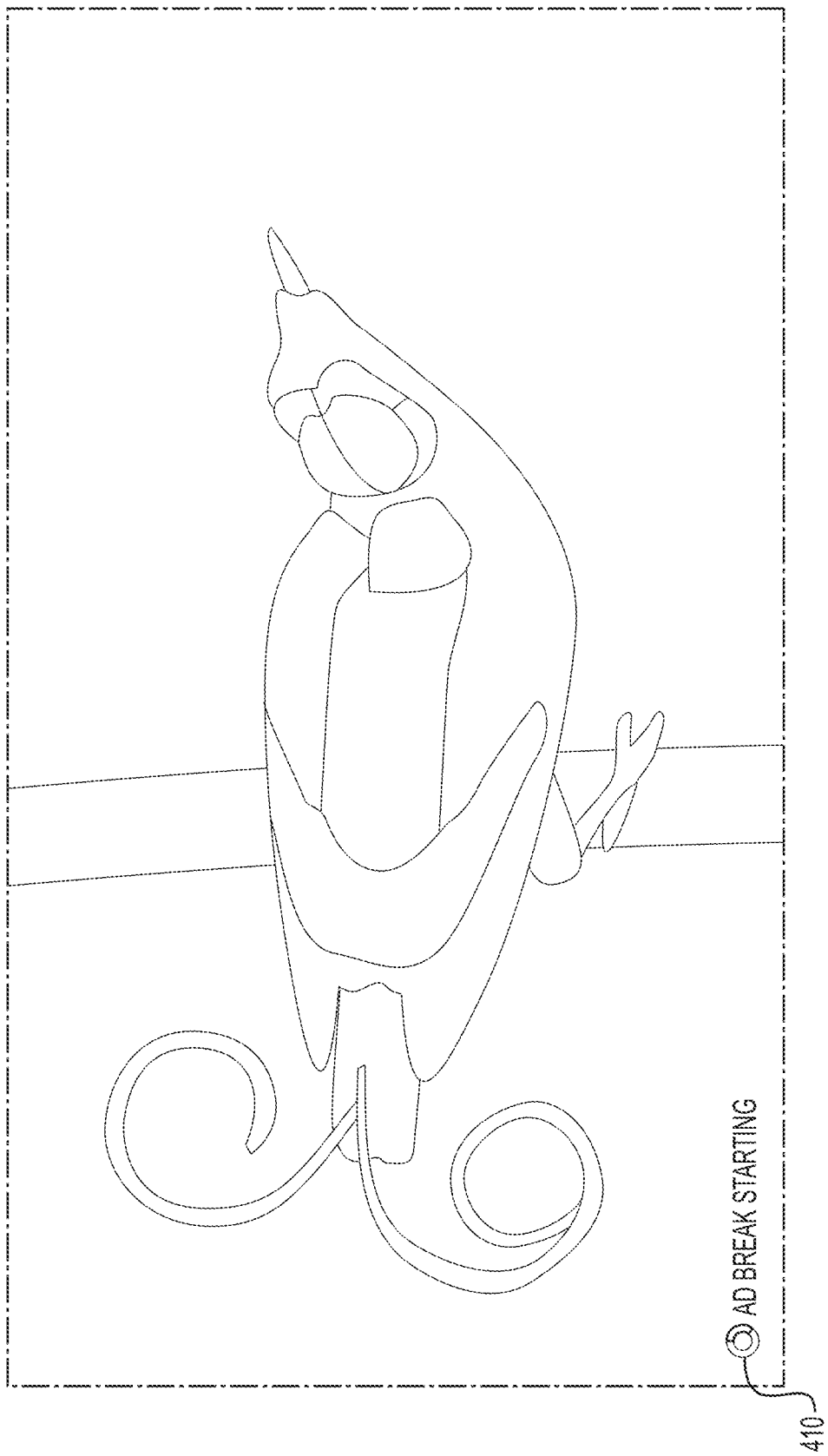
FIG. 4B illustrates an example of a full-screen display of a media item with a sponsored-content indicator.
Figure 4C:
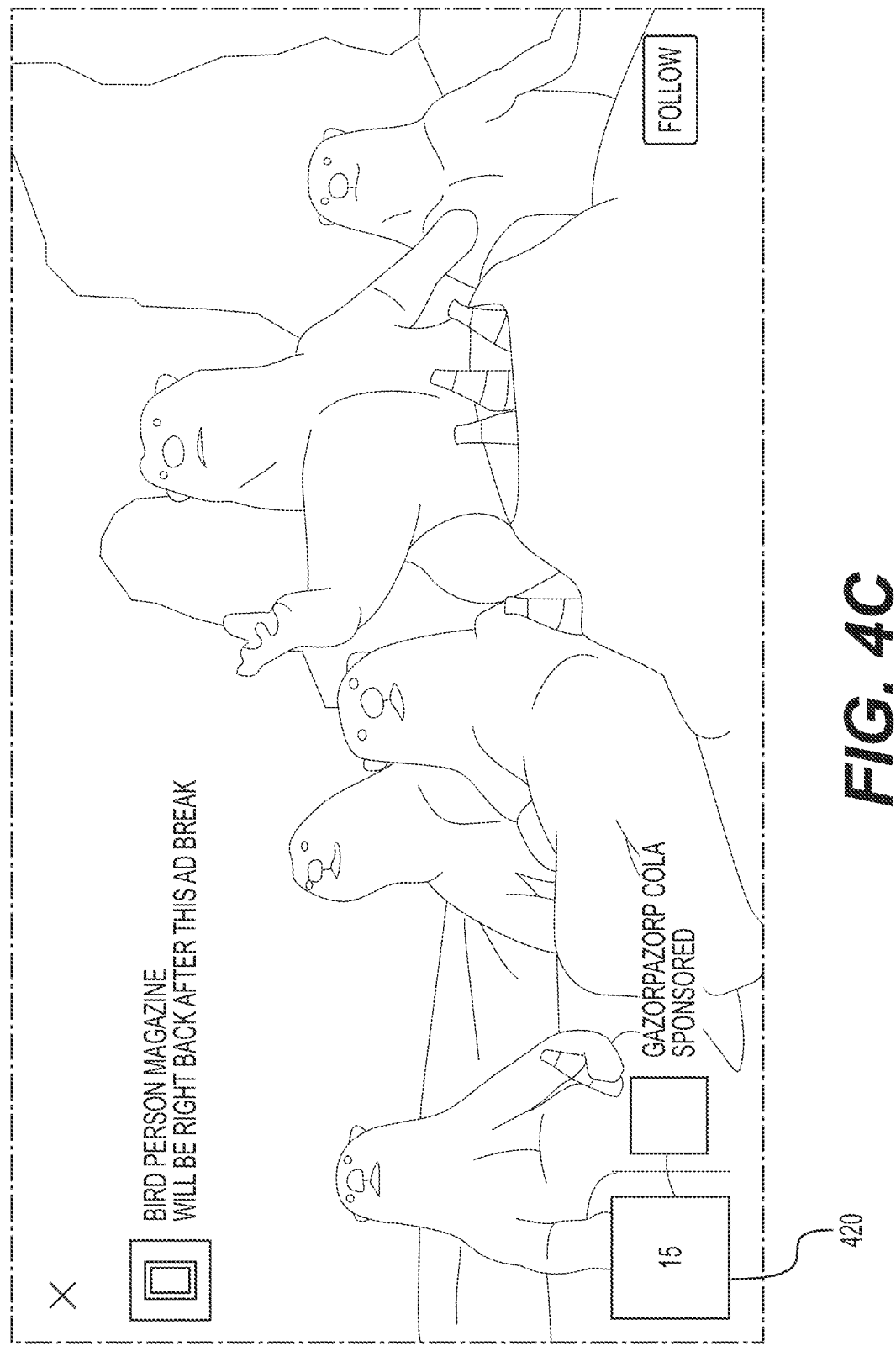
FIG. 4C illustrates an example of a full-screen display of a sponsored content item with a returning-content indicator.
Figure 5:
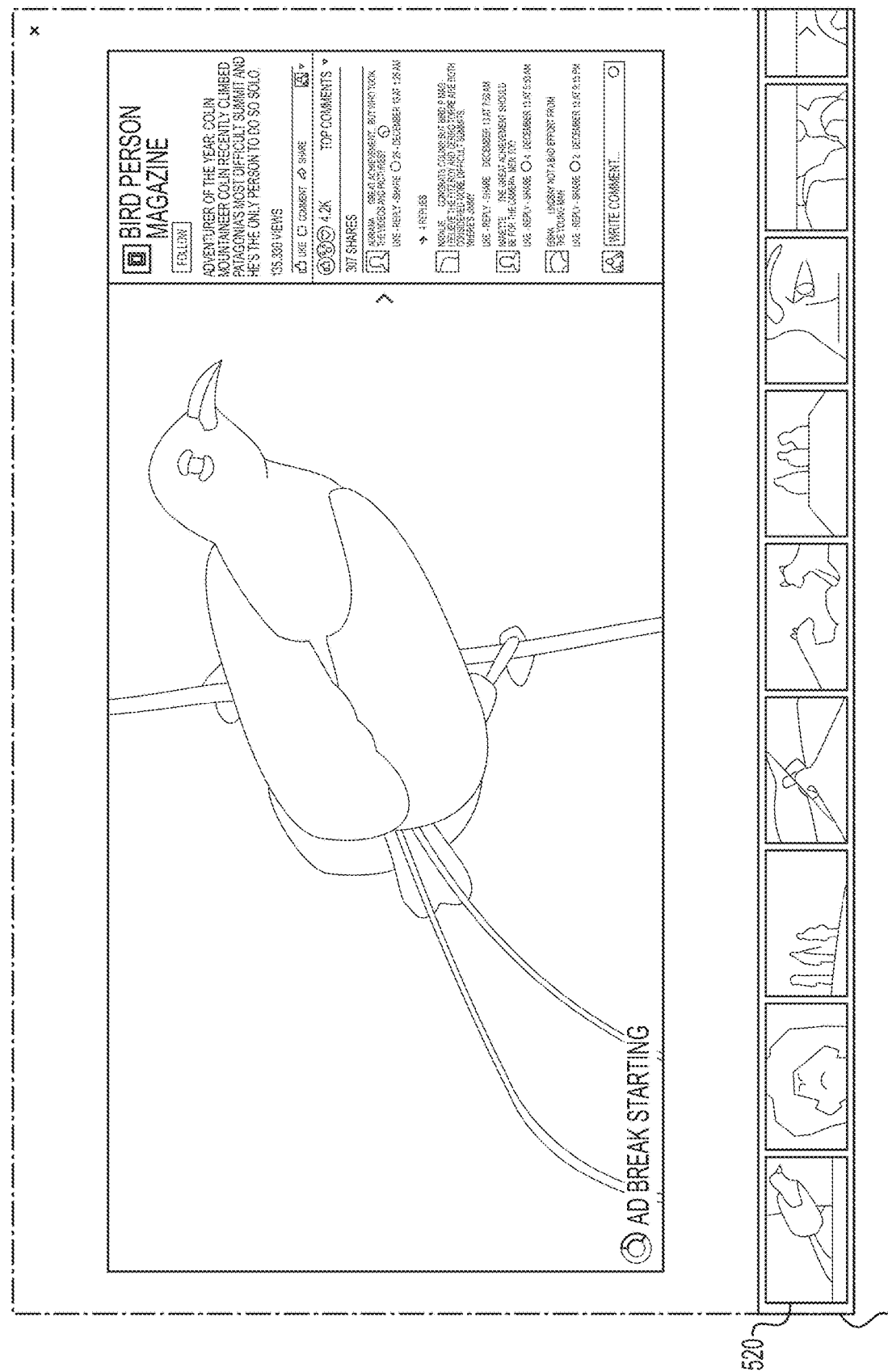
FIG. 5 illustrates an example media-item channel interface.

Although the disclosure has focused on particular interfaces (e.g., media items and sponsored content items displayed within a newsfeed of a online social network), the disclosure contemplates any suitable interface. FIGS. 4A-C illustrate one such other suitable interface. FIG. 4A illustrates an example of a full-screen display of a media item. FIG. 4B illustrates an example of a full-screen display of a media item with a sponsored-content indicator 410. FIG. 4C illustrates an example of a full-screen display of a sponsored content item with a returning-content indicator 420. FIG. 5 illustrates an example media-item channel interface. A media-item channel interface may present a series of media items (e.g., related media items) in succession. Referencing FIG. 5, a channel for "Bird Person Magazine" may currently be displaying the video 510. The media-item menu 530 may display thumbnails or other descriptors of media items in the channel that may be selected by the user or automatically progressed through. Within the media-item menu, the thumbnail 520 may correspond to the currently playing media item (i.e., the video 510).

Figure 6:
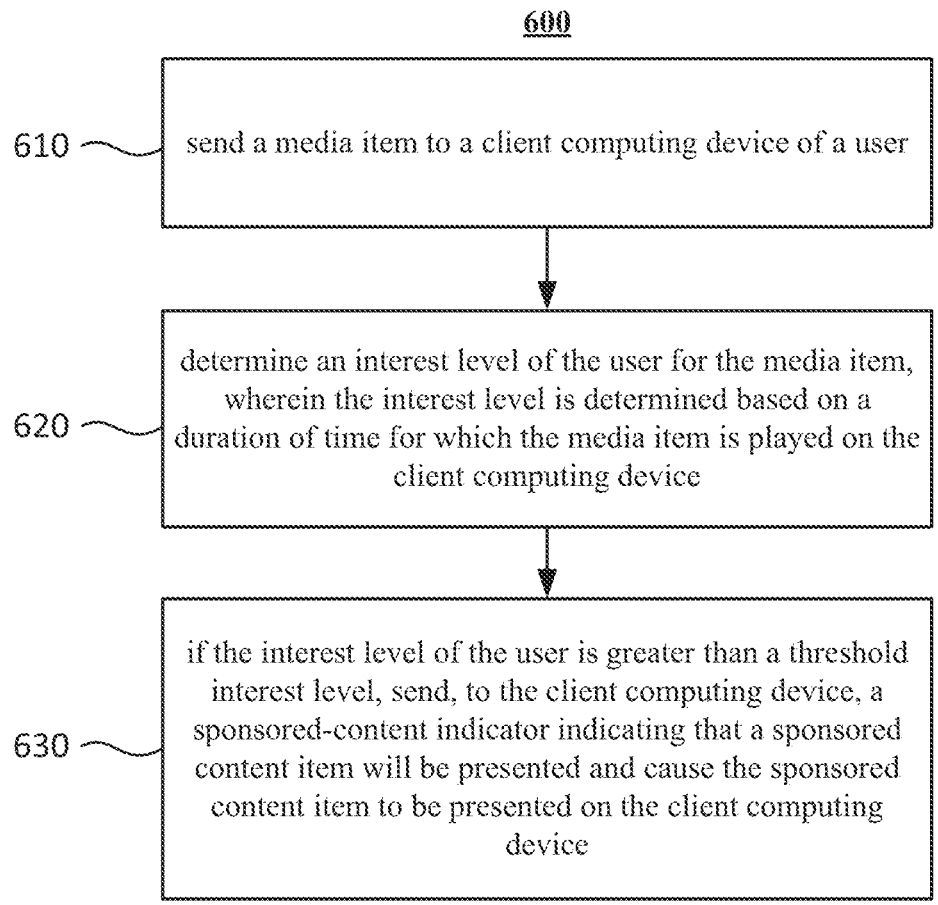
FIG. 6 illustrates an example method for determining when to present a sponsored content item during playback of a media item.

FIG. 6 illustrates an example method 600 for determining when to present a sponsored content item during playback of a media item. The method may begin at step 610, where a server computing machine may send a media item to a client computing device of a user. At step 620, the server computing machine may determine an interest level of the user for the media item, wherein the interest level is determined based on a duration of time for which the media item is played on the client computing device. At step 630, the server computing machine may, if the interest level of the user is greater than a threshold interest level, send, to the client computing device, a sponsored-content indicator indicating that a sponsored content item will be presented and cause the sponsored content item to be presented on the client computing device.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining when to present a sponsored content item during playback of a media item including the particular steps of the method of FIG. 6, this disclosure contemplates any suitable method for determining when to present a sponsored content item during playback of a media item including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Pausing Sponsored Content Items when Transitioning

FIGS. 7A-7D are example graphical user interfaces illustrating an example feed (e.g., a newsfeed) with media items in which a sponsored content item associated with a media item is paused when a user performs a transition (e.g., a scroll input or a tap selection of an adjacent media item). Such interfaces may be displayed using any appropriate client system 130 (e.g., a smartphone, a desktop computer, etc.). The newsfeed may include a plurality of media items (e.g., pre-recorded videos or live-streaming videos). The media items may be arranged from top to bottom in the newsfeed and may be accessed by transitioning (e.g., scrolling) through the newsfeed. The user may view a media item on his client system 130. When the user has viewed the media item for a certain duration of time, a sponsored content item (e.g., a video advertisement, a commercial, etc.) may be displayed on the client system 130 (as discussed above). The user may continue to watch the sponsored content item or scroll up/down to watch another media item in the newsfeed. When the user decides to watch another media item, the sponsored content item may be paused from playing. Paused sponsored content item may resume playing when the user returns to view the media item with which the sponsored content item is associated. The sponsored content item will resume playing from the same time from where the user left off. For example, if the user left off watching a commercial at the tenth second, then the commercial will resume playing from the tenth second when the user returns.

In particular embodiments, a server computing machine (e.g., a social-networking system 160) may render a newsfeed of an online social network on a client computing device (e.g., a client system 130) of a user. The newsfeed of the online social network may include a plurality of media items, which may include any content items that may be consumed by the user (e.g., a video, an audio file, a slide deck, an interaction content item such as a game, etc.). In particular embodiments, a media item may be either a pre-recorded or pre-generated media item (e.g., a pre-recorded video) or may be a live-stream (e.g., a live-streaming video). The media items may be arranged from top to bottom in the newsfeed and may be accessed by transitioning through the newsfeed. In particular embodiments, transitioning may include scrolling up/down through the newsfeed or tapping on an adjacent media item (e.g., located up or below the current media item) in the newsfeed, The user may interact with a media item and perform a transition (e.g., scroll action) to view other media items in the newsfeed using his client computing device. The client computing device may be a touch-enabled computing device capable of receiving touch input(s) from the user by way of touch gestures (e.g., swipe, drag, tap, pinch-to-zoom, etc.), or the client computing device may a non-touch/conventional computing device configured to receive user input(s) via input device(s) (e.g., keyboard, mouse, etc.). On the touch-enabled client computing device, the user may perform a scroll by performing a touch gesture on the screen (e.g., swipe up to access media items located down below in the newsfeed or swipe down to access media items located up in the newsfeed). On the conventional client computing device, a dedicated scroll bar may be provided on the newsfeed and the user may scroll through the newsfeed using the scroll bar with an input device associated with the client computing device.

Figure 7B:
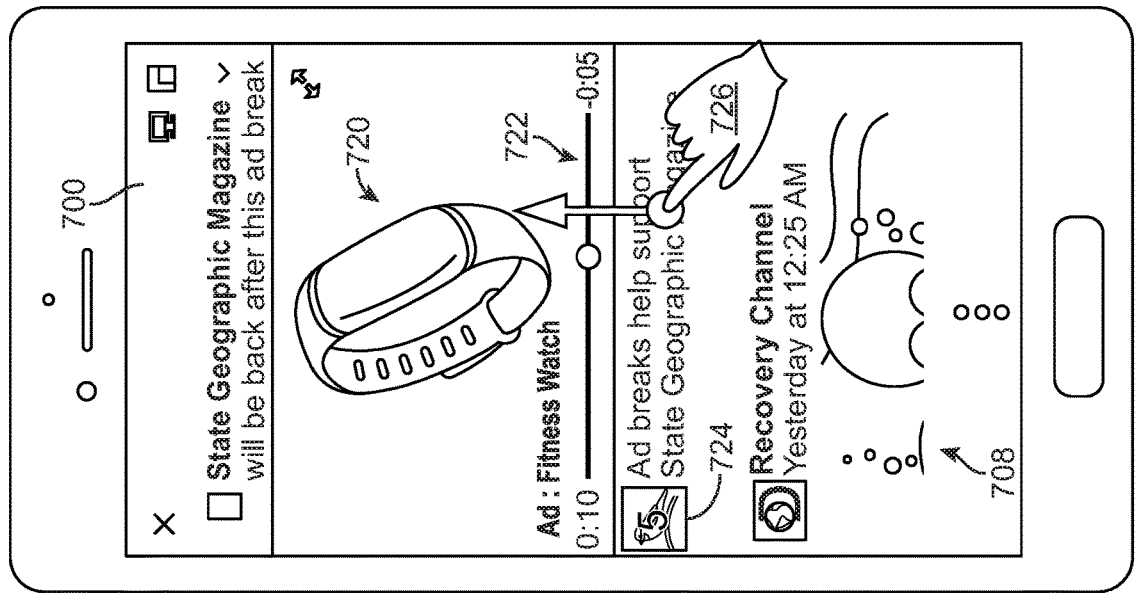
FIGS. 7A-7D are example graphical user interfaces illustrating an example newsfeed with media items in which a sponsored content item associated with a media item is paused when a user performs a transition (e.g., a scroll action).
Figure 7A:
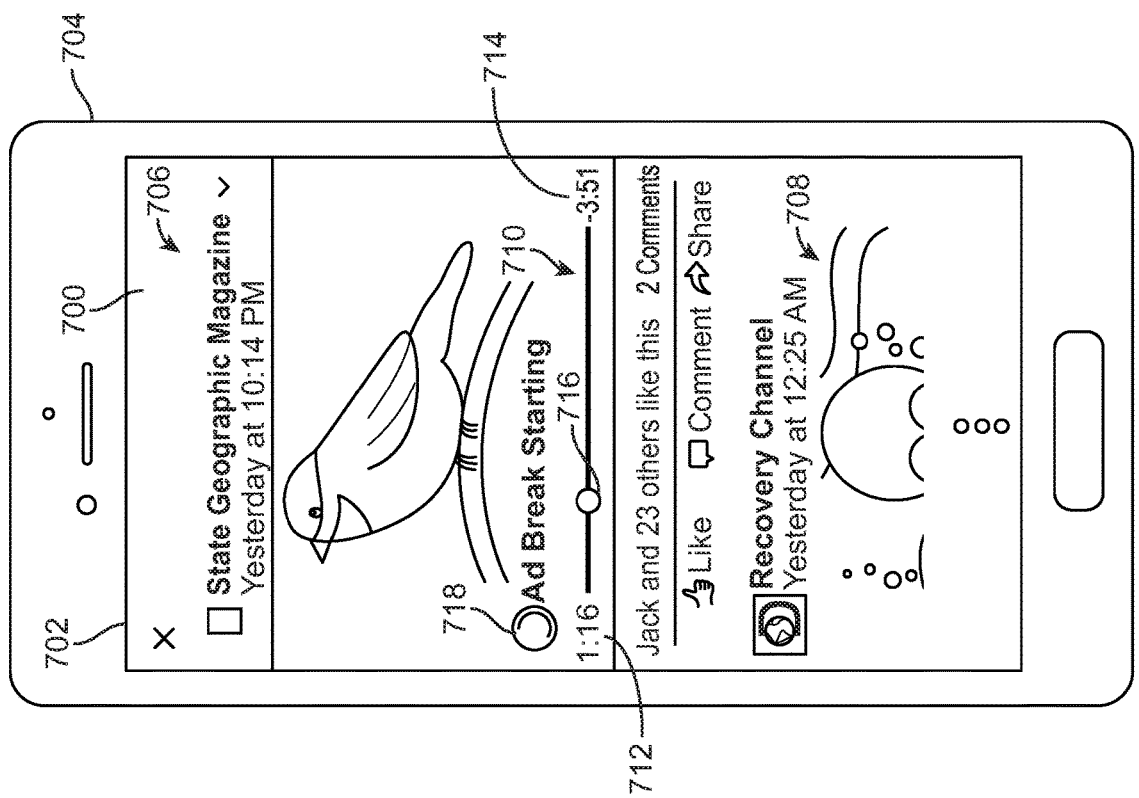

A user may view a media item (e.g., a video) on his client computing device. The server computing machine may keep track of the time as the user is viewing the media item. In particular embodiments, when the user has viewed the media item for a certain duration of time, the server computing machine may send a sponsored content item (e.g., a video advertisement, a commercial, etc.) for display on the client computing device (e.g., see FIG. 7B). For example, if the media item is a three-minute-long video and the user has watched the first one minute of that video, then the server computing machine may send a video advertisement for display on the client computing device after the completion of the one minute of the video. In particular embodiments, the server computing machine may send a sponsored content item for display based on determining an interest level of the user for the media item that he is watching. The interest level may be determined based on any number of suitable factors including, for example, a duration of time for which the media item is played on the client computing device, historical usage patterns of the user with respect to previous presentations of sponsored content items within media items, one or more topics associated with the media item, demographical information of the user, an affinity level of the user with respect to the sponsored content item, etc. (each of these factors discussed in detail in section "Indications for Sponsored Content Items"). In particular embodiments, prior to presenting the sponsored content item, the server computing machine may present a sponsored-content indicator on the media item indicating that the sponsored content item will be presented. The indicator may be a user-interface element that displays a countdown (numerically or graphically) to the time-point at which the sponsored content item will be presented (e.g., as shown in FIG. 7A).

Figure 7D:
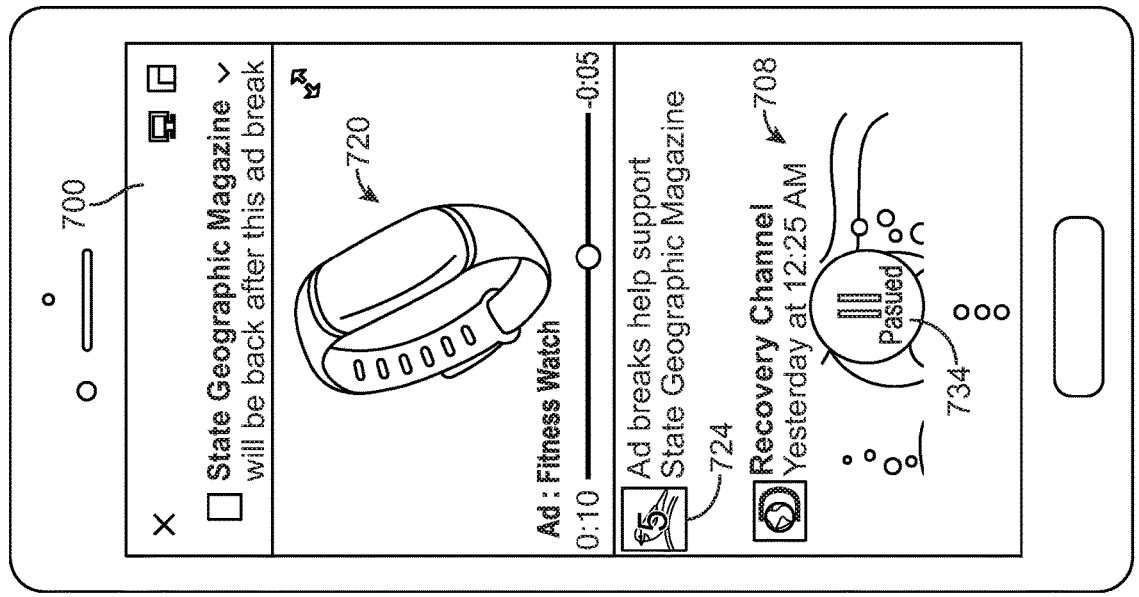
Figure 7C:
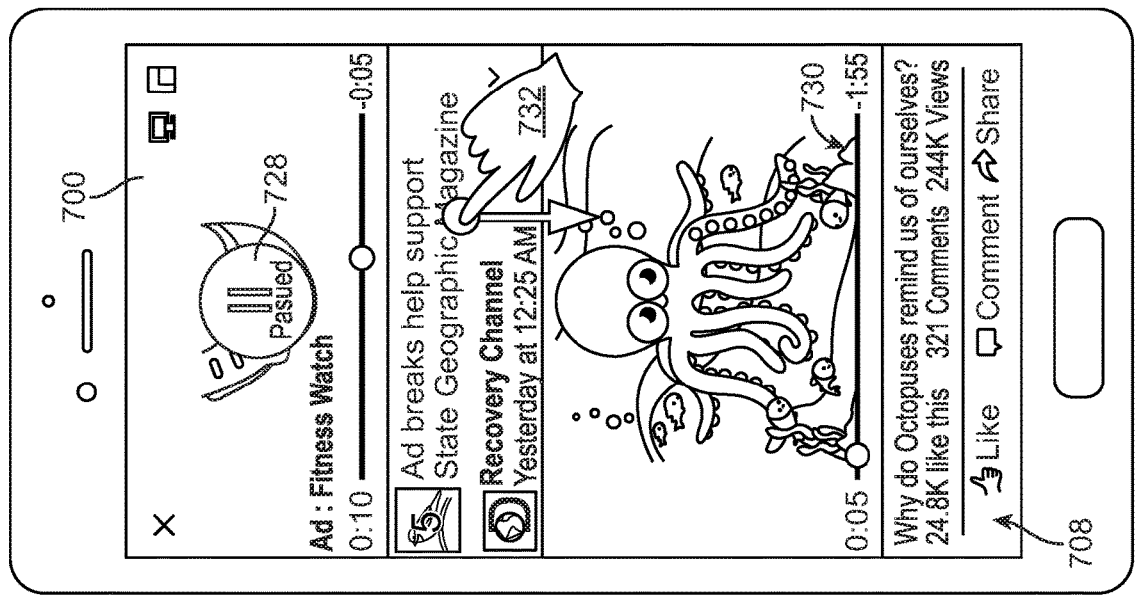

When the sponsored content item is presented to the user, the user may continue to watch the sponsored content item or scroll up/down to watch another media item in the newsfeed. In particular embodiments, when the user decides to watch another media item, the server computing machine may pause the sponsored content item from playing (e.g., as shown in FIG. 7C). The server computing machine may pause the sponsored content item at a time where the user left off for watching another media item. For example, if the user has watched five seconds of a 15 second commercial and decides to scroll down to watch a next media item in the newsfeed, then the server computing machine may pause the commercial at sixth second to later resume the playback from where the user left off watching the commercial. The server computing machine may resume the playback of the paused sponsored content item when the user returns to view the media item with which the sponsored content item is associated (e.g., as shown in FIG. 7D). The server computing machine may resume the playback from the same time from where the user left off. For example, if the user left off watching a commercial at the tenth second, then the server computing machine may resume the playback from the tenth second of the commercial (e.g., as shown in FIGS. 7B and 7D).

Pausing a sponsored content item is advantageous for both the user and a sponsored-content-item provider. For the user, the pausing is advantageous as it permits the user to skip out from the sponsored content item (for later viewing) and view other media items in the newsfeed. The user may at anytime go back to continue viewing the paused sponsored content item. This is different from prior or existing implementations where a user has to either skip the entire commercial or wait until the end of the commercial to view a media item. So, in a way, the pausing feature of the present invention allows a user to skip watching a sponsored content item (for a while) without actually skipping the sponsored content item. For the sponsored-content-item provider, the pausing is advantageous as it ensures that the sponsored content item will be watched by the user.

In some embodiments, when a user returns to a media item with which a paused sponsored content item is associated, the paused sponsored content item may not be resumed for playing and instead the media item will resume playing on the client computing device. Resuming the sponsored content item may be based on a determination of whether a threshold number of sponsored content items has been presented to the user within a specified period of time. For example, the threshold number of sponsored content items may be five commercials per day (or a total of 35 commercials in a week), and if this number is satisfied for a particular day (e.g., by presenting five commercials within other media items in that day) then when the user returns to a media item with which a paused sponsored item is associated, the media item will resume playing instead of the sponsored content item since the user has already watched enough sponsored content items for the day.

In particular embodiments, apart from the server computing machine pausing a sponsored content item from playing, the server computing machine may also be configured to pause a media item when a user performs a scroll (e.g., as shown in FIGS. 7C and 7D). For example, when a user is viewing a first media item (e.g., a video) and performs a scroll to view a second media item located above or below the first media item, then the first media item may be paused at a time when the user left off from viewing it. The first media item may resume playing from the same time when the user returns to the same location in the newsfeed where the first media item is located.

FIGS. 7A-7D are example graphical user interfaces illustrating an example newsfeed with media items in which a sponsored content item associated with a media item is paused when a user performs a scroll. In particular, FIG. 7A is a graphical user interface illustrating a newsfeed 700 displayed on a screen 702 of a client computing device (e.g., a mobile device) 704. The newsfeed 700 may contain at least media item 706 and 708. The media item 706 is a video, associated with "National Geographic Magazine" channel, that shows information about birds. A user may scroll through the newsfeed 700 by performing touch gestures on the screen 702. For example, the user may swipe up to view media item(s) located down in the newsfeed 700 (see FIG. 7B) or swipe down to view media item(s) located up in the newsfeed 700 (e.g., see FIG. 7C). A time bar may be associated with each of the media items 706 and 708. For example, as shown with respect to the media item 706, a time bar 710 may indicate a current runtime (712) and a remaining runtime (714) of the media item 706. A runtime indicator 716 may be shown in the time bar 710 to indicate a current runtime position of the media item 706. When the user has watched the media item 706 for a certain duration of time, a sponsored-content indicator 718 will be presented to the user. For example, once the user has finished watching one minute of the media item 706, the sponsored-content-item indicator 718 may appear at a certain location within the media item 706 (e.g., a bottom left corner of the media item 706). The sponsored-content-item indicator 718 may indicate to the user graphically or numerically how much time is remaining before a sponsored content item (e.g., a commercial) is presented to the user.

FIG. 7B is a graphical user interface illustrating an example sponsored content item 720 that may be shown within the media item 706 once the user has viewed the media item 706 for a certain duration of time (as discussed above). The sponsored content item 720 may be shown in response to the sponsored-content-item indicator 718 completing its cycle of remaining time in FIG. 7A. As depicted, the sponsored content item 720 is a 15 second commercial for a fitness watch. Similar to the time bar 710 in FIG. 7A, a time bar 722 may be shown indicating current runtime (left), remaining runtime (right), and a current runtime location indication (round dot/ball in the time bar 722) to the user. A returning-content indicator 724 may be presented in proximity to the sponsored content item 720. The returning-content indicator 724 may display a numerical countdown indicating an amount of time remaining before the media item 706 is resumed. For example, as depicted, the returning-content indicator 724 indicates that the media item 706 will resume playing in five seconds. Anytime during the runtime of the sponsored content item 720, the user may scroll up or down to view other media item(s) in the newsfeed 700. For example, the user may perform a scroll up gesture 726 to bring the media item 708 upward for viewing. As soon as the user performs a scroll, the sponsored content item 720 may be paused at the current runtime of the item. For example, when the user performs the scroll up gesture 726, the sponsored content item 720 is paused at the tenth second of its runtime.

FIG. 7C is a graphical user interface illustrating the second media item 708 surfaced upward in the newsfeed 700 when the user performs the swipe up gesture 726 in FIG. 7B. As depicted, the runtime of the sponsored content item 720 is paused (indicated by a pause indicator 728). The media item 708 relates to a video about "Why do Octopuses remind us of ourselves?" and the video is associated with the Discovery Channel. Similar to the time bar 710, a time bar 730 may be shown indicating current runtime (left), remaining runtime (right), and current runtime indication (round dot/ball in the time bar 730) to the user. Anytime during the runtime of the media item 708, the user may scroll up or down to view other media item(s) in the newsfeed 700. For example, the user may perform a scroll down gesture 732 to bring back the media item 706 for viewing. As soon as the user performs a scroll, the media item 708 may be paused at its current runtime (indicated by a pause indicator 734 in FIG. 7D). For example, when the user performs the scroll down gesture 732, the media item 708 is paused at the fifth second of its runtime. The media item 708 may resume playing when the user returns back to the same location in the newsfeed.

FIG. 7D is a graphical user interface illustrating the sponsored content item 720 resumed playing from the time where the user left off in FIG. 7B. The user can finish watching the sponsored content item 720 and once the item 720 is finished, the media item 706 will resume playing. In some embodiments, instead of the sponsored content item 720, the media item 706 will resume playing when the user returns upon performing the swipe down gesture 732 in FIG. 7C. For example, the user may have met his sponsored-content-items watch quota by watching a certain number of sponsored content items within other media items and therefore, the sponsored content item 720 may be skipped and the media item 706 will resume playing, as discussed elsewhere herein.

Figure 8:
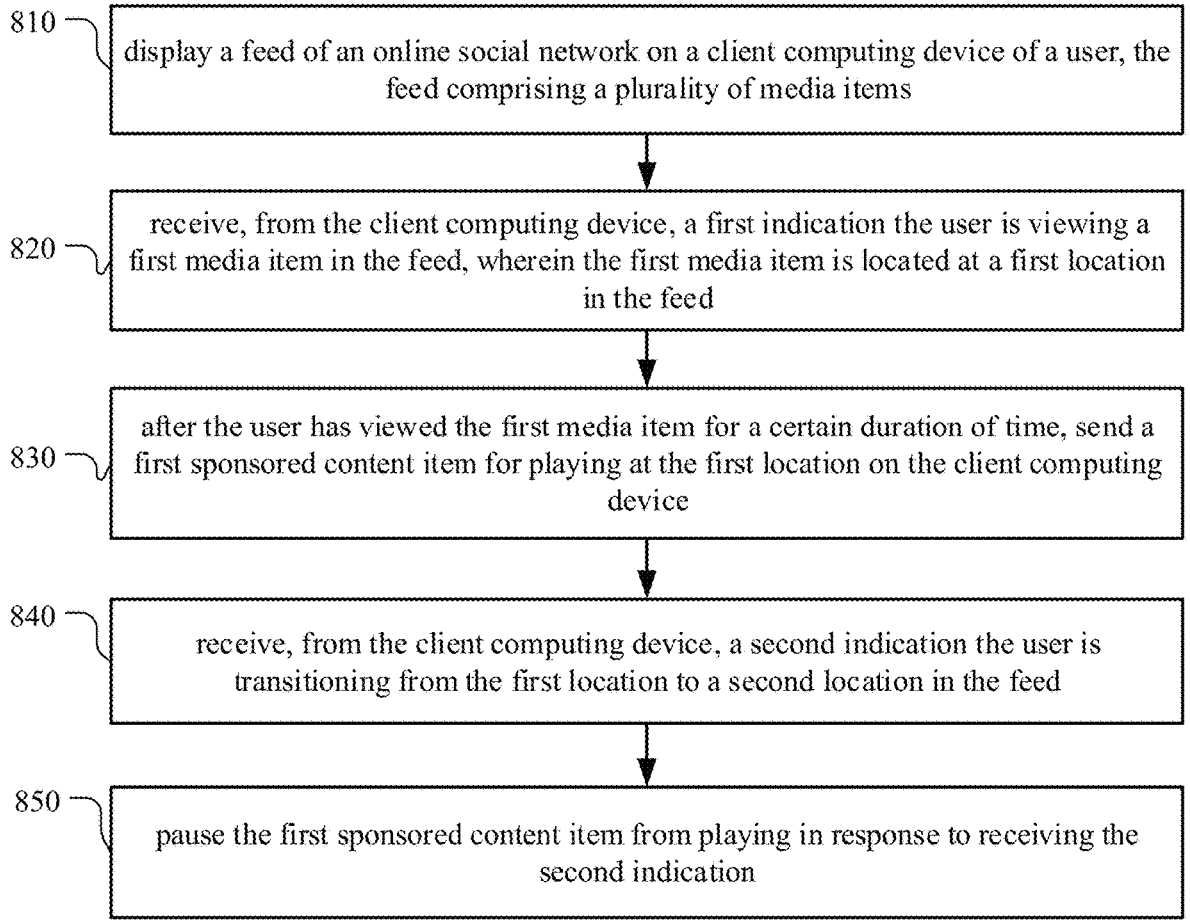
FIG. 8 is a flowchart of an example method for pausing a sponsored content item from playing when a user performs a transition (e.g., a scroll action).

FIG. 8 is a flowchart of an example method 800 for pausing a sponsored content item from playing when a user performs a transition (e.g., scroll action). The method may begin at step 810, where one or more computing systems (e.g., a social-networking system 160) may display a feed (e.g., newsfeed) of an online social network on a client computing device (e.g., a client system 130) of a user. The feed may comprise a plurality of media items. At step 820, the one or more computing systems may receive, from the client computing device, a first indication the user is viewing a first media item in the feed, wherein the first media item is located at a first location in the feed. At step 830, after the user has viewed the first media for a certain duration of time, the one or more computing systems may send a first sponsored content item for playing at the first location on the client computing device. At step 840, the one or more computing systems may receive, from the client computing device, a second indication the user is transition (e.g., scrolling) from the first location to a second location in the feed. At step 850, the one or more computing systems may pause the first sponsored content item from playing in response to receiving the second indication.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for pausing a sponsored content item from playing including the particular steps of the method of FIG. 8, this disclosure contemplates any suitable method for pausing a sponsored content item from playing including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Broadcaster and Viewer Interfaces

As is explained above, the media item that a server computing machine sends to a client computing device (or client system) may be a pre-recorded or pre-generated media item (such as in the form of a newsfeed), or may be a live-stream (e.g. live video). The following is an example of a first client user (first user) using a client system to broadcast a live video and optional sponsored content items via the server computing machine to one or more second client users (second users) on their respective client systems. As it would be understood, a "live video" may refer to a video stream or any other form of multimedia (or media item) that is transmitted over a computer network, such as the Internet, in real time or in near real time. For example, the server computing machine (e.g. social-networking system 160, described above) may continuously receive/capture a live video stream from the first client user, and as it is received, immediately broadcast it to the second client users, as opposed to the server computing machine receiving the entire video from the first client user before making it available to the second client users. In the present example, the second client users may be friends of the first client user, where the term "friend" may refer to any other client user of the social-networking system with whom the first client user has formed a connection, association, or relationship via the social-networking system (e.g., on an online social network).

In particular embodiments, the server computing machine provides a broadcaster (user) interface to the first client user and a viewer (user) interface to the second client users. The broadcaster interface permits the first client user to interact with the server computing machine, such as to submit live video to the server computing machine for delivery to the second client users, or to indicate to the server computing machine when the first client user desires to send a sponsored content item to the second client users. Similarly, the viewer interface permits the second client users to interact with the server computing machine, such as to receive and render the live video or sponsored media item.

Figure 9A:
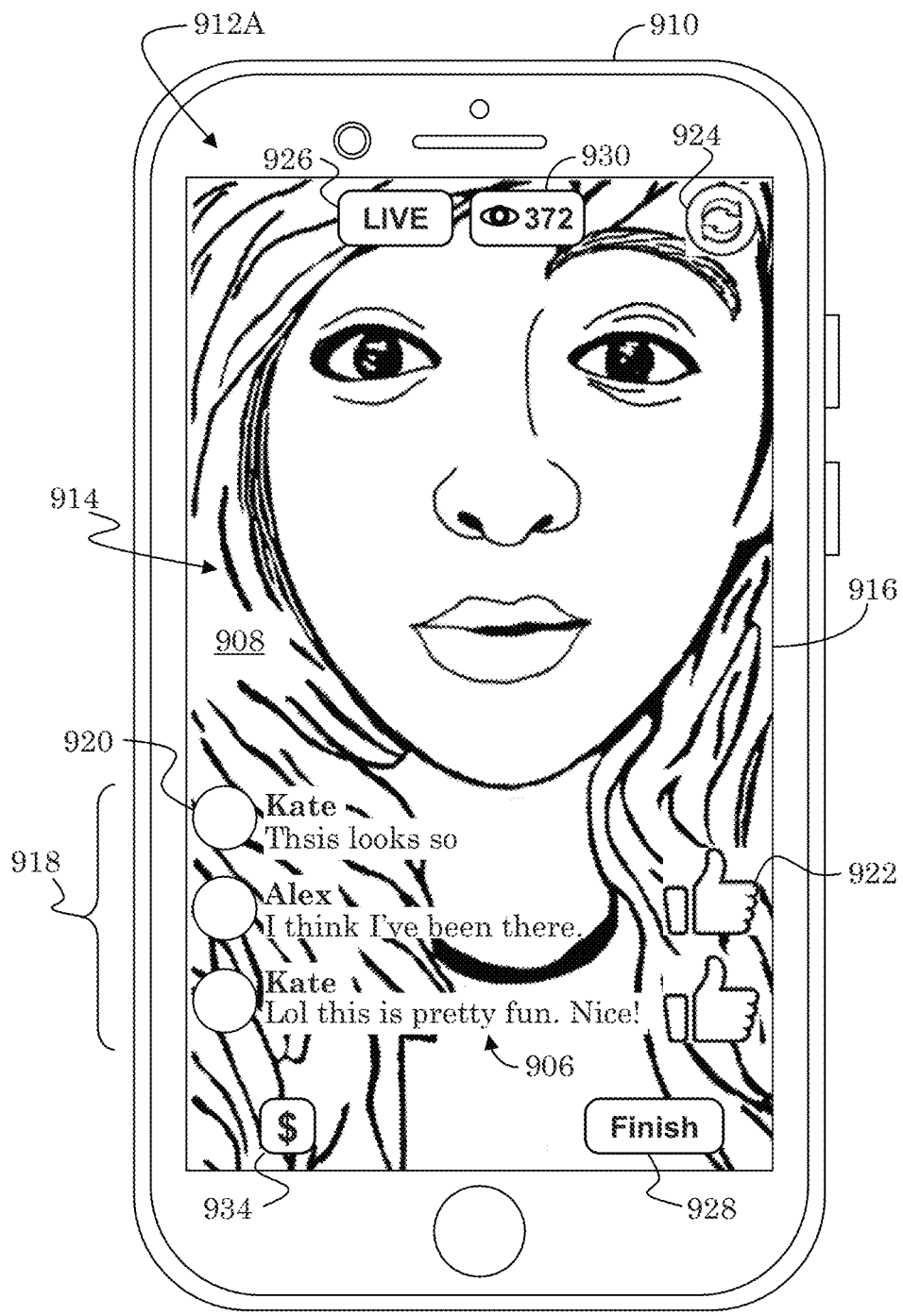
FIG. 9A illustrates a view of a broadcaster interface while broadcasting a live video and prior to electing to send a sponsored content item to viewers of the live video.

FIG. 9A illustrates a client system 910, such as a mobile device or mobile phone, which the first client user may use to broadcast a live video 914. In the example of FIG. 9A, client system 910 is shown with a broadcaster interface 912A before the first client user has indicated any desire to provide a sponsored content item to the second client users. Broadcaster interface 912A includes live video area 908 in which the live video 914 is displayed. In the present example, live video area 908 substantially covers an entire screen area 916 of client system 910, which provides the first client user with a view similar to what the second client users are likely to see during the broadcasting of live video 914. A portion of the screen area 916 may be designated as a comments area 918 to display comments posted to the social networking system by viewers of the live video 914. In the present example, comments area 918 overlaps live video area 908 such that posted comments are displayed over live video 914. Posted comments may include text 906, images 920, and symbols or glyphs 922.

Broadcaster interface 912A may further include a camera (switch) option 924 by which the first client user may select among multiple cameras integrated onto client system 910 through which to capture live video 914. A live indicator 926, which may take any appropriate form, provides an indication of when a broadcasting session is active. Similarly, a selectable finish option 928 provides a mechanism by which the first client user may stop/end the broadcast session (i.e. stop broadcasting live video 914).

Additionally, a viewer count 930 may provide a real-time, running count of the number of viewers (i.e. second client users) currently viewing the broadcast of live video 914. Viewer count 930 may provide an indication for controlling when a sponsored content item may be provided to viewers of live video 914. For example, broadcaster interface 912A shows a sponsored option 934, which the first client user may select during the broadcasting of live video 914 to indicate to the server computing machine that a sponsored content item should be displayed/provided to the second client users. In particular embodiments, however, sponsored option 934 may remain inactive (or hidden) within broadcaster interface 912A until viewer counter 930 indicates that a predetermined minimum number of viewers (e.g. 100 viewers) are currently viewing live video 914. When the minimum number of viewers is met, then sponsored option 934 may become active (or made visible, or otherwise altered in appearance to indicate that it is active). By monitoring viewer count 930, the first client user may anticipate when a sponsored content item may become available for sending to the second client users. Other conditions for displaying (or activating) the sponsored option 934 during the broadcast of the live video may include, for example, if a minimum amount of time has elapsed since the live video began or since a previous sponsored content item was provided, or if the first client user has a number of followers (e.g., followers on an online social network) exceeding a minimum number of followers.

Figure 9B:
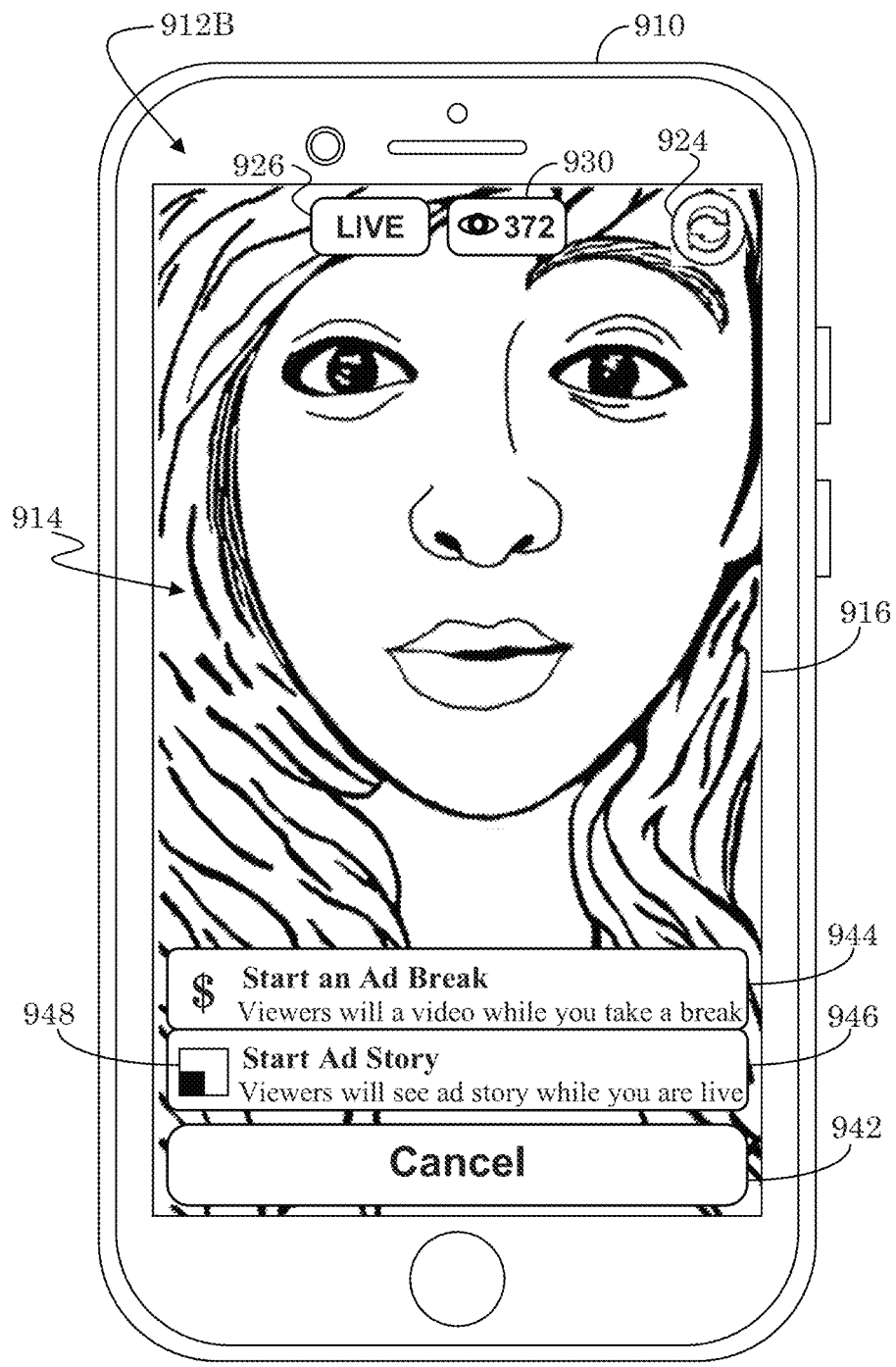
FIG. 9B illustrates a view of a broadcaster interface after electing to send a sponsored content item to viewers, but prior to choosing among multiple content-types of sponsored content items.

In response to the first client user selecting sponsored option 934 of broadcaster interface 912A, the broadcaster interface may be altered to broadcaster interface 912B illustrated in FIG. 9B. All elements in FIG. 9B similar to those of FIG. 9A have similar reference characters and are described above. A cancel option 942 permits the first client user to cancel the current request for a sponsored content item, and to return to the broadcaster interface 912A of FIG. 9A.

Broadcaster interface 912B further provides the first client user with a choice of multiple types of sponsored content items. For illustrative purposes, broadcaster interface 912B shows examples of two types of sponsored content items. A first content-type example, corresponding to a first type of sponsored content item 944, may include a combination of audio-and-video content, and a second content-type example, corresponding to a second type of sponsored content item 946, may include only visual content. The sponsored content items corresponding to the second type of sponsored content item 946 may be one or more still images. In broadcaster interface 912B, the first type of sponsored content item 944 is illustratively labeled "Ad Break" (and may refer to a transition from a live media item (i.e. live video 914) to a pre-recorded audio/video segment), and the second type of sponsored content item 946 is illustratively labeled "Ad Story" (and may refer to a visual narrative, or story, portrayed in a series of still images). In particular embodiments, the first client user is given a reward, such as monetary compensation, for selecting to send sponsored content items to the second client users. The different choices of sponsored content items (944 and 946) may be associated with different values of reward.

As is explained above, the sponsored content items sent to individual second client users may be individually customized to each specific second client user. The customization may be based on, for example, a history of interactions by the individual second client user, prior preferences provided by the individual second client user, social graph data associated with the individual second client user, etc.

The different content-types of sponsored content items (e.g. 944 and 946) may further be differentiated by how a selected content-type (944 or 946) affects the broadcast of the live video 914. In the first content-type example, selection of the first type of sponsored content item 944 may result in interrupting (or pausing) the broadcast of live video 914, and replacing the broadcast of live video 914 with the audio-and-video sponsored content item of choice 944. That is, broadcast of live video 914 may cease while audio-and-video sponsored content items are displayed to the second client users. In some embodiments, various steps may be taken to assure that the second client users view their respective sponsored content items at substantially the same time. In the second content-type example, selection of the second type of sponsored content item 946 may result in no interruption of the broadcast of live video 914. In this case, as is indicated by symbol 948, the live video 914 may continue in a manner similar to a picture-in-picture (PIP)

image on the viewer interface while simultaneously sending sponsored content items to the second client users. Both of the first content-type example and second content-type example are discussed in more detail, below.

To better understand the first content-type example and the second content-type example, it may be beneficial to first describe the viewer interface, as viewed by the second client users, prior to receiving any sponsored content item, and to then describe how the broadcaster interface and viewer interface may change during the sending of different types of sponsored content items.

Figure 10:
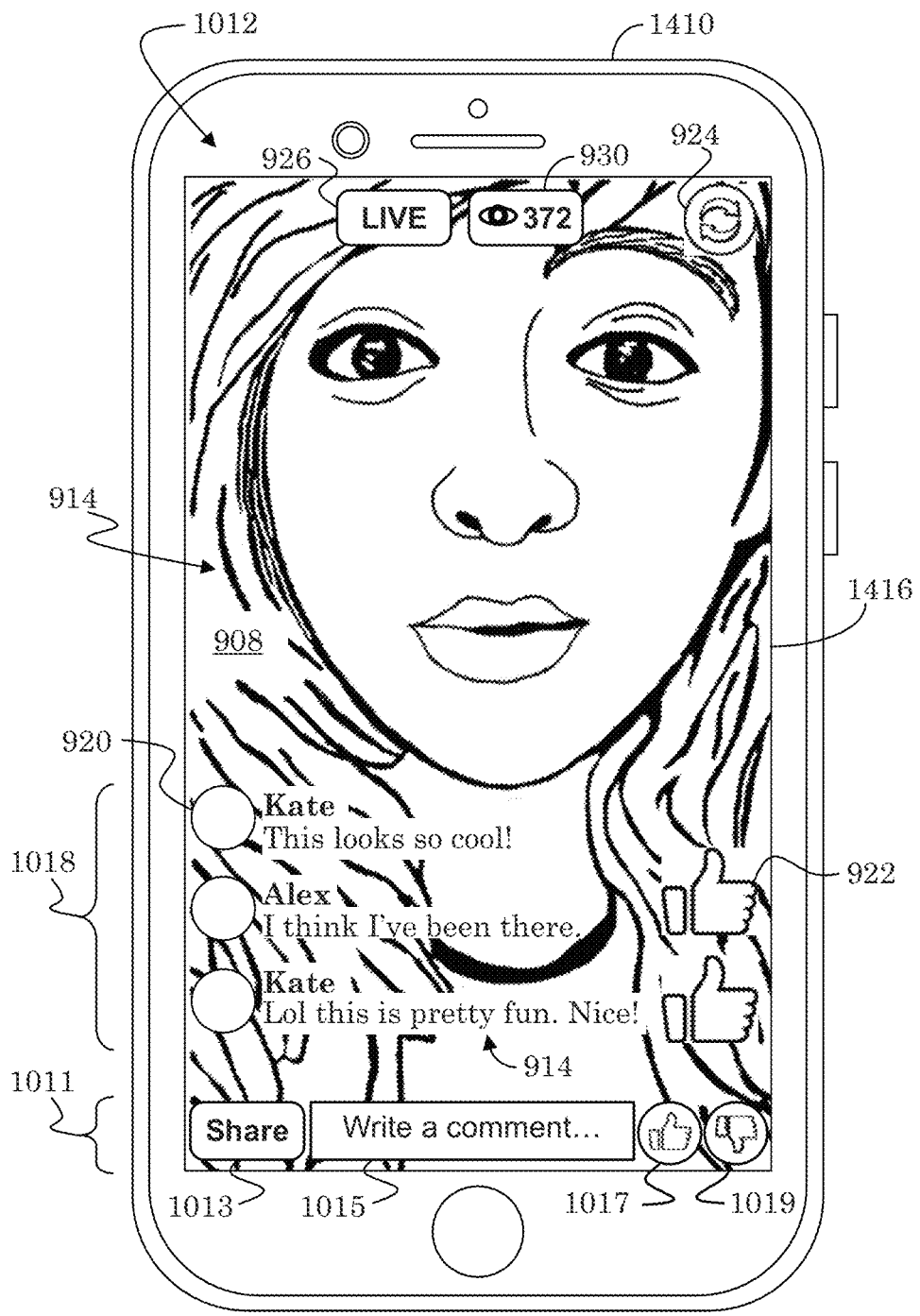
FIG. 10 illustrates a view of a viewer interface while receiving live video and prior to receiving a sponsored content item.

FIG. 10 shows an example client system 1410, as used by a second client user, and illustrates an example viewer interface 1012 on a screen area 1416 during the receiving of live video 914 and prior to receiving a sponsored content item. As is explained above, broadcaster interface 912A of FIG. 9A, during the broadcasting of live video 914, shows what a second client user is may see on viewer interface 1012 while receiving the broadcast of video 914. Thus, broadcaster interface 912A and viewer interface 1012 have several elements in common. Elements in FIG. 10 similar to those of FIG. 9A have similar reference characters and are described above. Viewer interface 1012 of FIG. 10 differs from broadcaster interface 912A in that viewer interface 1012 provides a share option 1013, by which a second client user may share information related to live video 914 with friends of the second client user on the social-networking system. Viewer interface 1012 further provides a comments windows 1015 through which the second client user may post or submit comments. Additionally, the second client user may further submit a "like" vote via a first glyph option 1017 or a "dislike" vote via a second a glyph option 1019.

Live Media-Item Transitions

The following is an example of interrupting a live video broadcast to provide a sponsored content item to second client users. In the present example, the sponsored content item may include both visual and audio components. In particular embodiments, a server computing machine (e.g., a social-networking system 160) may provide an interface operable to permit the first client user (of a first client system 130) to broadcast a live video to one or more second client systems 130 of one or more second client users. In response to receiving an indication that the first client user, while broadcasting the live video, selected an option within the interface to display a sponsored content item, the server computing machine 160 may start loading the sponsored content item (e.g., a media item such as video, still image, or audio) to the one or more second client systems 130 while the broadcasting of live video is still ongoing. While loading the sponsored content item to the one or more second client systems 130 of one or more second client users, the server computing machine 160 may inform the first client user (such as via the interface) that loading of the sponsored content item is ongoing even while the broadcast of the live video is active. After loading the sponsored content item to the one or more client systems (of the second client user), the server computing machine may inform the one or more second users that the sponsored content item will soon be displayed. The server computing machine may then signal all the loaded sponsored content items to start playing at substantially the same time on the second client systems 130.

Figure 11A:
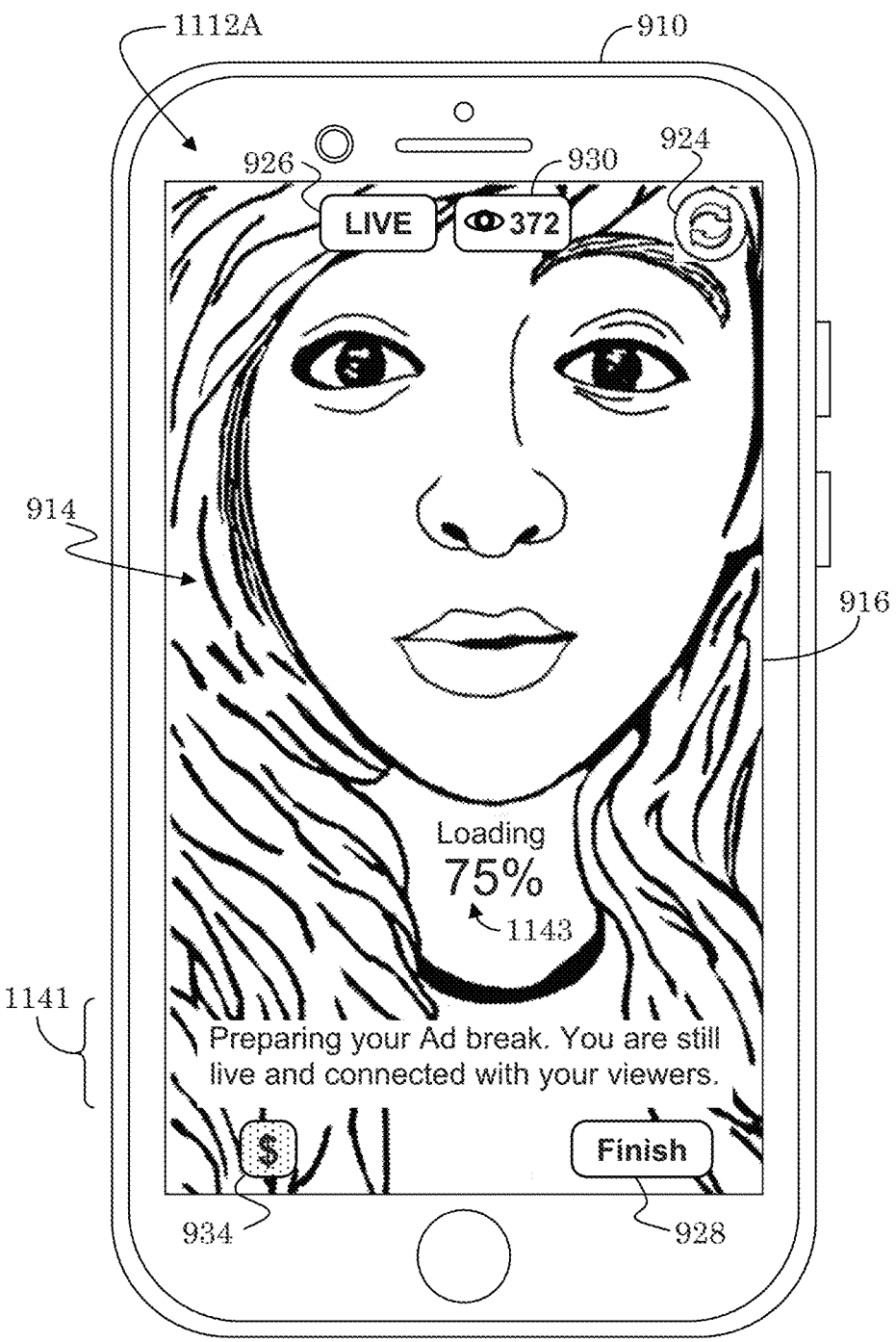
FIGS. 11A-11C illustrate various views of a broadcaster interface that may be associated with choosing to pause the live broadcast and send a first content-type of sponsored content item that includes audio-and-video components.

Returning to FIG. 9B, in response to the first client user selecting the first type of sponsored content item 944 (indicating that the first client user wishes to interrupt the live video broadcast and send an audio-and-video sponsored content item to the second client users), the broadcaster interface 912B may change to broadcaster interface 1112A of FIG. 11A. As is explained above, in embodiments, each of the second client users may receive a different sponsored content item (all being of the first type of sponsored content item, in the present example) individually selected for each second client user, and thus the first client user may be unaware of the specific sponsored content item sent to each individual second client user. However, since the broadcasting of the live video 914 ceases while the second client users are watching their respective sponsored content item, it is beneficial to synchronize the watching of sponsored content items by second client users in order to assure that the second client users experience the ceasing and resuming of the broadcast of the live video 914 at substantially the same time.

In some embodiments, the server computing machine responds to receiving an indication that the first client user selected the first type of sponsored content item 944 by individually loading a sponsored content item to each client system 1410 (see FIG. 10) of each second client user while the broadcasting of live video 914 is still active (ongoing). During this time, the second client users may be unaware of the loading of their respective sponsored content item. After the individually selected sponsored content items have been loaded onto the client systems 1410, the server computing machine will synchronize the displaying of the loaded sponsored content items to the respective second client users.

The server computing machine may further respond to receiving the indication that the first client user selected the first type of sponsored content item 944 by having the broadcaster interface 1112A display a message 1141 (or other indicator) informing the first client user that an ad break is being prepared (i.e., the sponsored content items are being loaded to the client systems 1410 of the second client users), and that the first client user is still live and connected with the second client users. In this manner the first client user may continue to broadcast the live video 914 while waiting for the start of the ad break. Additionally, broadcaster interface 1112A may display a load-progress indicator 1143 indicating a progress of loading the sponsored content items to the client systems 1410 of the second client users. The load-progress indictor 1143 may take the form of a progress bar (or other progression-indicating display) or a percentage value indicating a percent of client systems 1410 to which their respective sponsored content items have been loaded, or to which their respective sponsored content have not yet been loaded.

In embodiments, the live video includes a visual component and an audio component, and once the loading of the sponsored content item to the client systems 1410 of the second client users has finished, broadcasting of the live video, or of the visual component of the live video, ceases and the first client user is informed of the imminent start of the ad break prior to the start of the ad break.

Figure 11B:
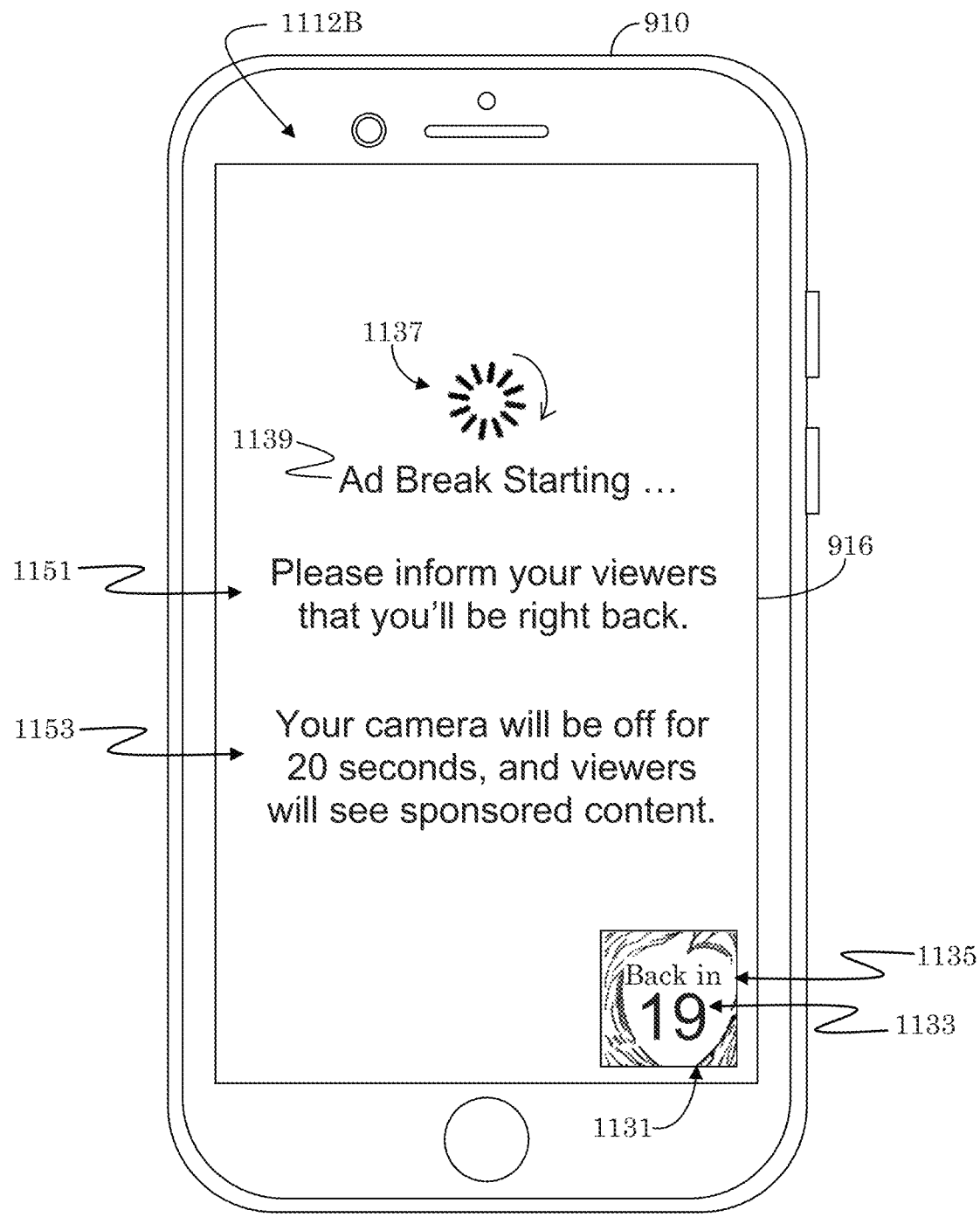

FIG. 11B illustrates an example broadcaster interface 1112B immediately prior to the start of the ad break. As examples of how broadcaster interface 1112B may inform the first client user that the start of the ad break is imminent, the display of the live video may be removed from screen area 916 (since broadcasting of the live video, or the visual component of the live video, has ceased) and replaced with a smaller, optionally still, image 1131 associated with the first client user. Optionally, a break timer (or other time-lapse indicator) 1133 may be displayed indicating an amount of time left until the broadcast of the live video resumes. To assure accuracy of break timer 1133, the sponsored content items loaded in the client systems 1410 of the second client users are of the same predefined duration and made to start at substantially the same time. Optionally, a message 1135 may be displayed explaining the purpose of break timer 1133. Additionally, a second message 1139 and second time-lapse indicator 1137 may be displayed informing the first client user that the ad break is imminent (starting soon).

If the broadcast of the visual component of the live video is ceased while the audio component continues to be broadcasted, another optional indicator, such as another message, 1151 may be displayed instructing the first client user to verbally inform the second client users that broadcasting of the live video will resume immediately following the end of displaying the sponsored content item. Alternatively, the server computing machine may send a pre-recorded audio message to the client systems 1410 of the second client users audibly informing them that the live video broadcast will resume following the sponsored content item.

In some embodiments, broadcaster interface 1112B may further provide a message 1153 informing the first client user that the camera used to capture the live video will be off for a predefined period of time substantially coinciding with the display duration of the sponsored content item (e.g., the duration of the ad break), and that the second client users will see the sponsored content item while the camera is off.

Figure 11C:
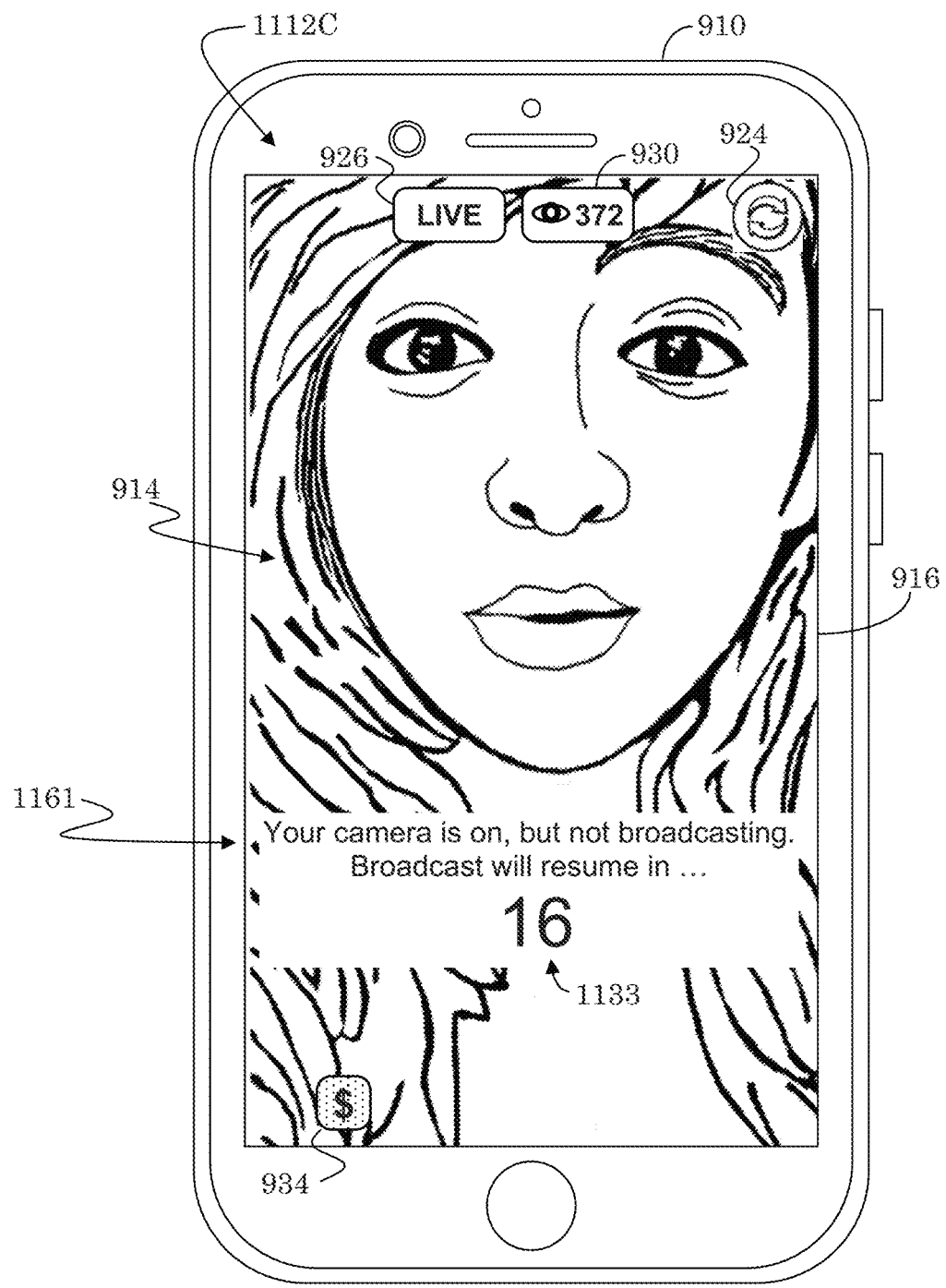

In embodiments, the camera used to capture the live video may remain on while broadcasting of the live video is ceased, or paused, during the displaying of the sponsored content items to the second client users. FIG. 11C illustrates a broadcaster interface 1112C wherein the camera used to capture live video 914 remains on while broadcasting of the live video 914 is paused. A message 1161 may be provided to remind the first client user that the camera is on, but not broadcasting. The message may further remind the first client user that broadcasting will resume shortly, i.e., following the displaying of the sponsored content items to the second client users. In the present example, break timer 1133 may be displayed below message 1161. Having the camera on and break timer 1133 displayed permits the first client user to ensure that the subject of live video 1114 is properly positioned within the field of view of the camera immediately prior to resumption of the live broadcast.

Figure 12A:
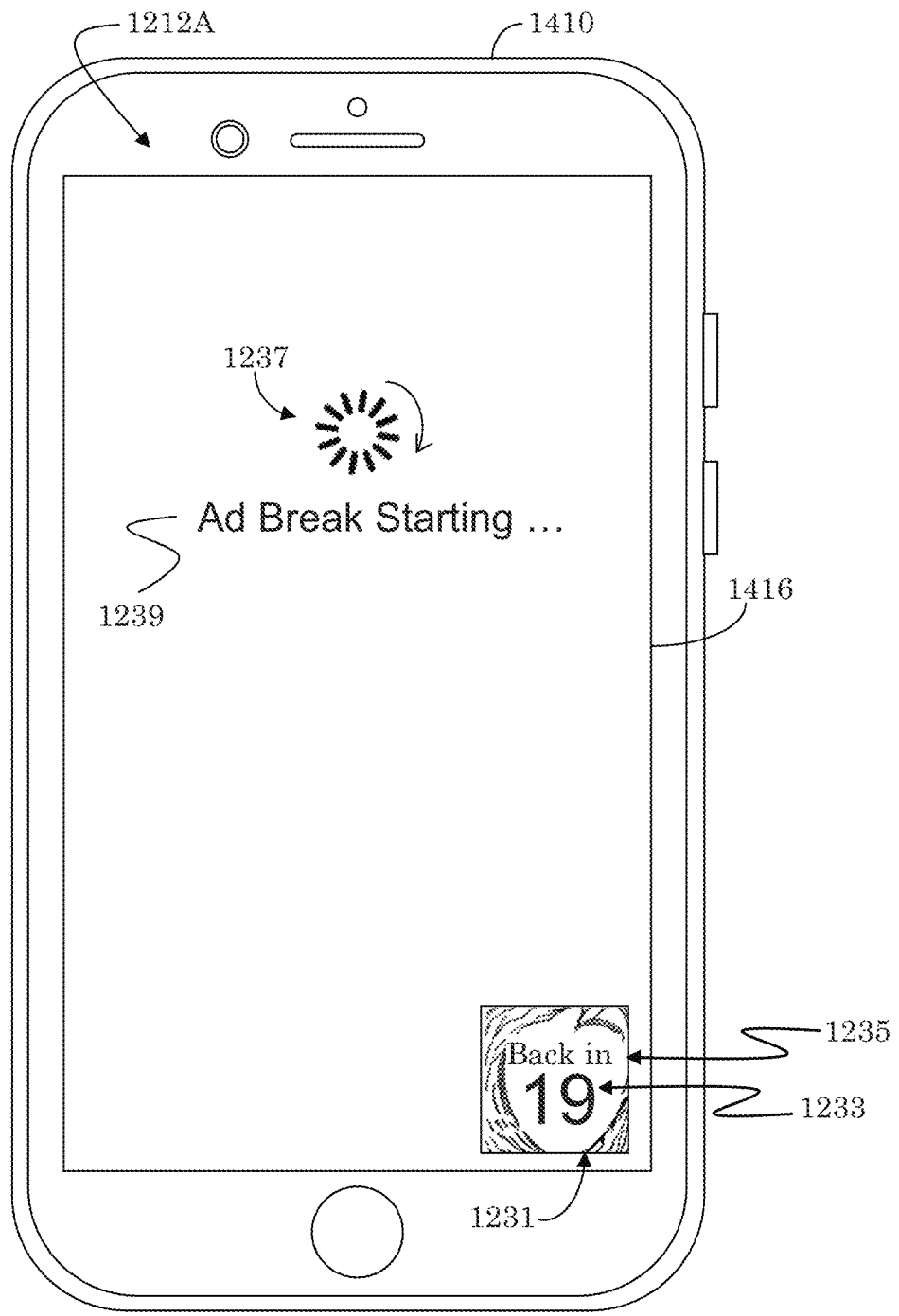
FIGS. 12A-12G illustrate various views of a viewer interface that may be associated with receiving a sponsored content item while the live video broadcast is paused.

While the first client user is being shown broadcaster interface 1112B of FIG. 11B, the second client users may be shown viewer interface 1212A of FIG. 12A. That is, immediately prior to the start of the ad break, viewer interface 1212A is shown on the client systems 1410 of the second client users. Viewer interface 1212A provides an indicator, such as message 1239 or time-lapse indicator 1237, to indicate to the second client users that the start of a sponsored content item is imminent (will start soon, e.g. within two seconds). Optionally, viewer interface 1212A further provides an image 1231 associated with the first client user, which may remind a current second client user or inform a new second client user just joining the broadcast of the first client user, that the sponsored content item is momentarily interrupting the broadcast of the first client user. Optionally, a break timer (or other time-lapse indicator) 1233 may be displayed indicating an amount of time left before resumption of the interrupted live video broadcast. Viewer interface 1212A may further include a message 1235, which may be personalized by the first client user, reminding the second client users that broadcast of the live video will resume after viewing the sponsored content item. During the displaying of viewer interface 1212A, the client systems 1410 of the second client users may receive an audio message, either verbally broadcasted by the first client user or prerecorded and provided by the server computing machine, stating that broadcasting of the live video will resume following the showing of a sponsored content item.

Figure 12B:
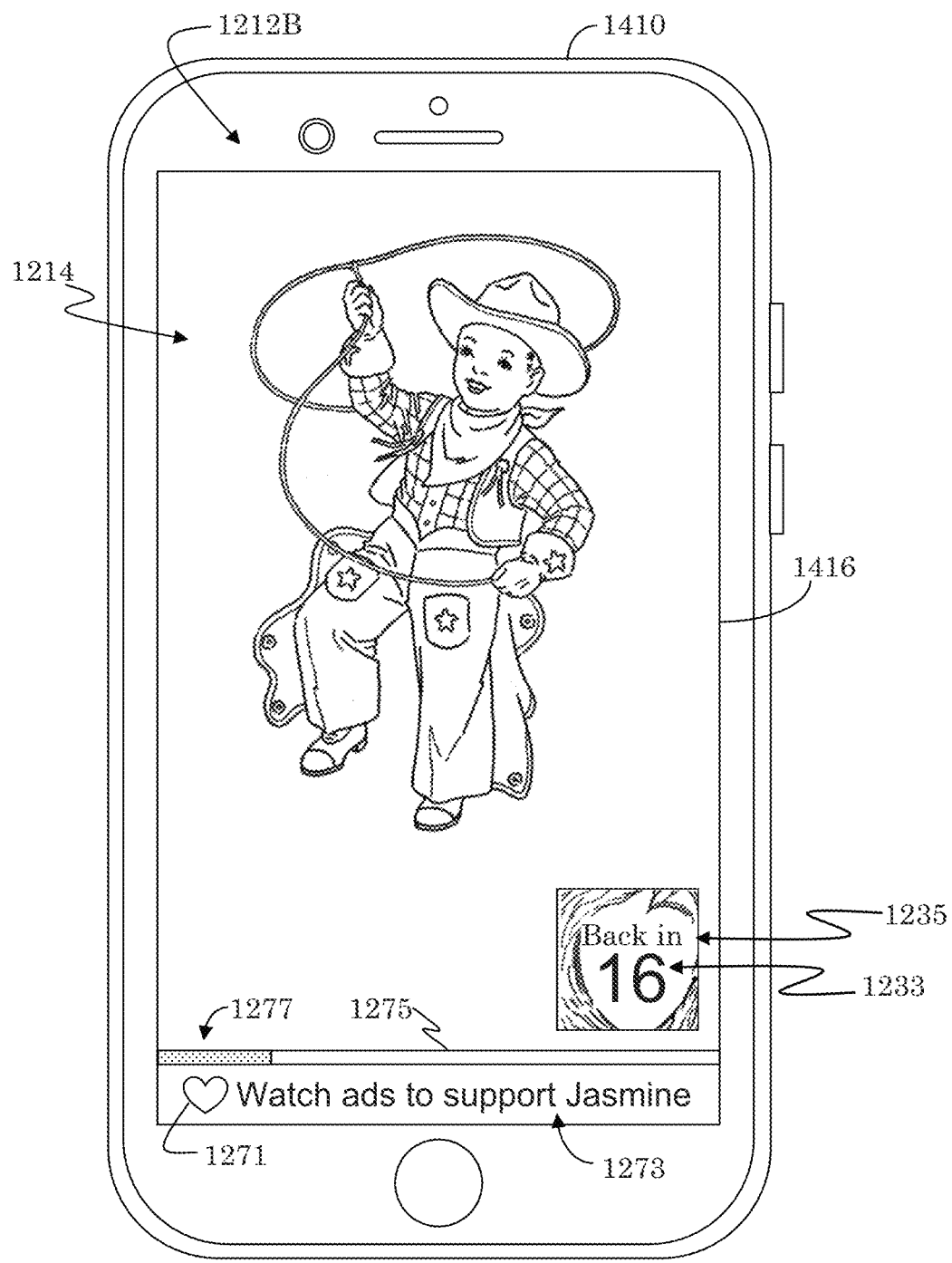

FIG. 12B illustrates an example viewer interface 1212B at the start of an example sponsored content item 1214. Break timer 1233 and a message 1235 may continue to be displayed. Additionally, a symbolic indicator of support 1271 or a message of support 1273 for the first client user may be displayed. The symbolic indicator of support 1271 and message of support 1273 inform the second client users that they may express support for the first client user by watching the sponsored content item 1214. A progress bar (or other time-lapse indicator) 1275 may be provided indicating how much time is left until resumption of the live video broadcast. In the present example, a darkened area 1277 of progress bar 1275 indicates a percentage of the sponsored content item (time) that has already been displayed.

Figure 12C:
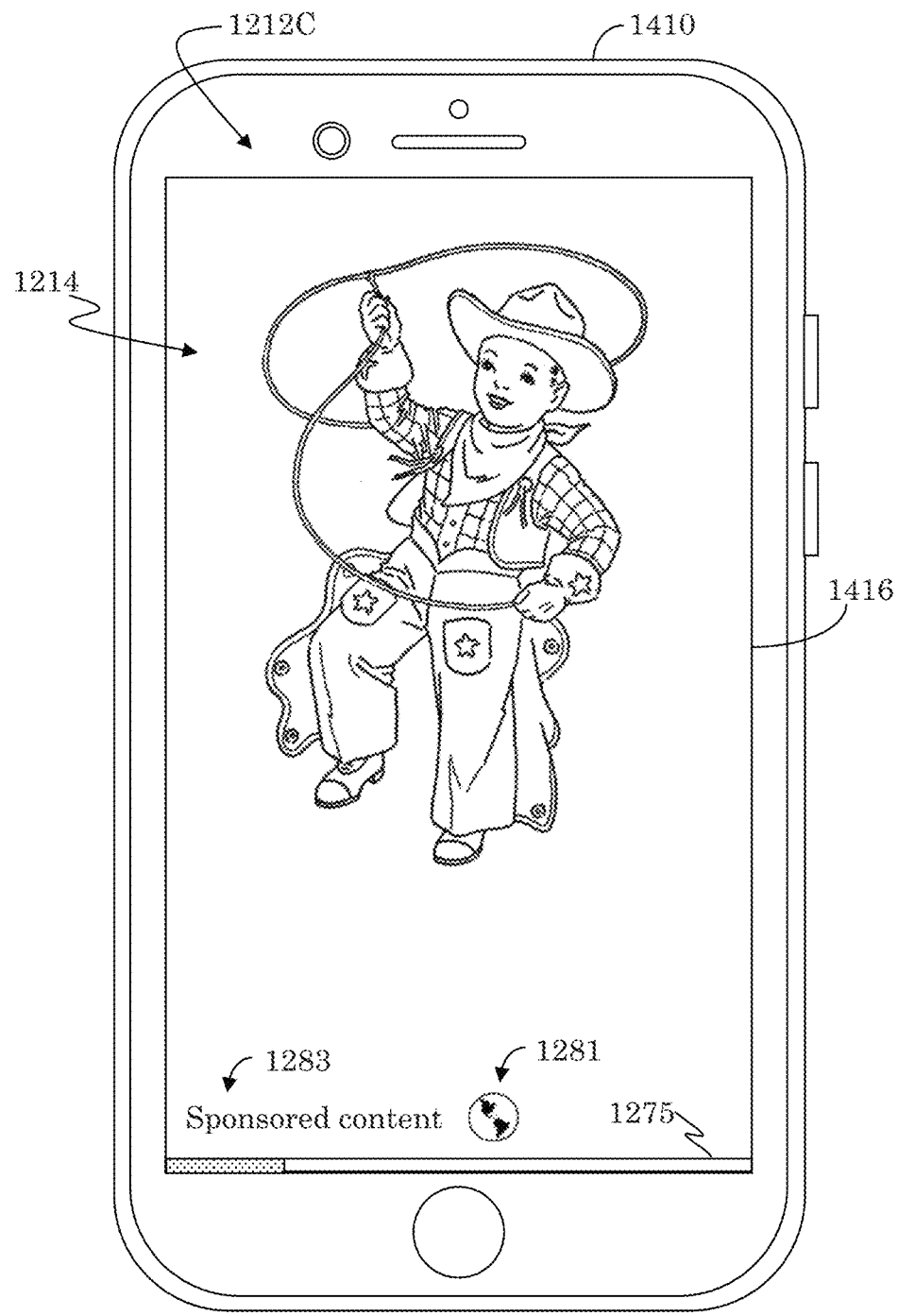

After a predefined amount of time, the symbolic indicator of support 1271, message of support 1273, break timer 1233, and a message 1235 may be removed, as shown in viewer interface 1212C of FIG. 12C. Progress bar 1275 may further be moved to the bottom of screen area 1416 to free up more screen space for sponsored content item 1214. Optionally, an indicator, such as a message 1283 or glyph 1281, may be provided to inform all new and current viewers that what is being currently displayed is not the live video broadcast from the first client user, but a sponsored content item.

Figure 12D:
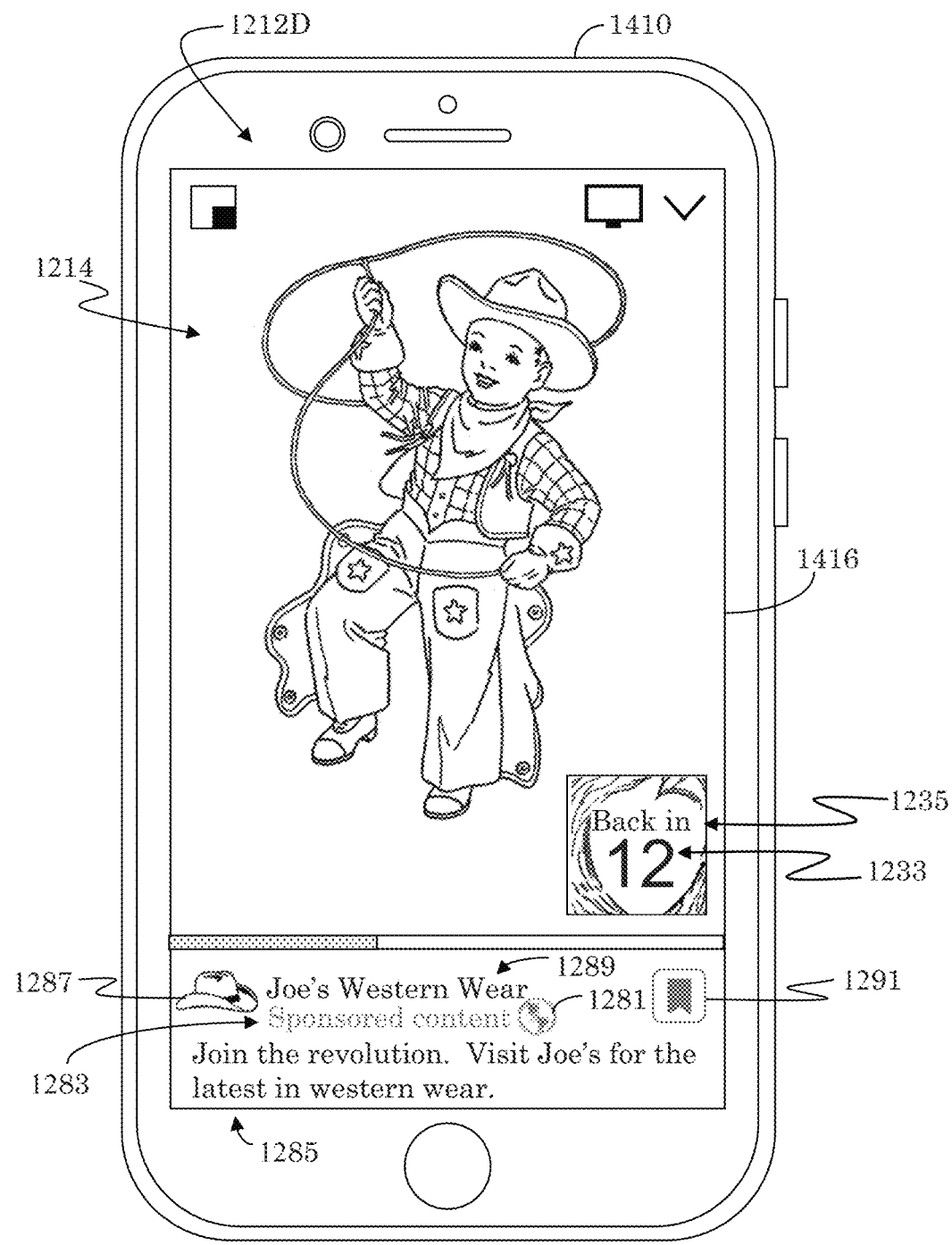

During the displaying of sponsored content items, the second client users may continue to interact with screen area 1416. In response to an interaction of a second client user with screen area 1416, viewer interface 1212D of FIG. 12D may be displayed. In this example, break timer 1233 and message 1235 may again be displayed to provide a current timer value for the remaining duration of the current sponsored content item. Optionally, additional information related to the sponsored content item may be displayed. The additional information may include a name 1289 or a logo 1287 of the sponsor of the sponsored content item 1214. Additional information may further include a message 1285 (such as a website, promotion, or contextual description) from the sponsor of the sponsored content item 1214. Optionally, a selectable option 1291 for saving (e.g., recording, or saving a link to) the sponsored content item 1214 being provided.

Figure 12E:
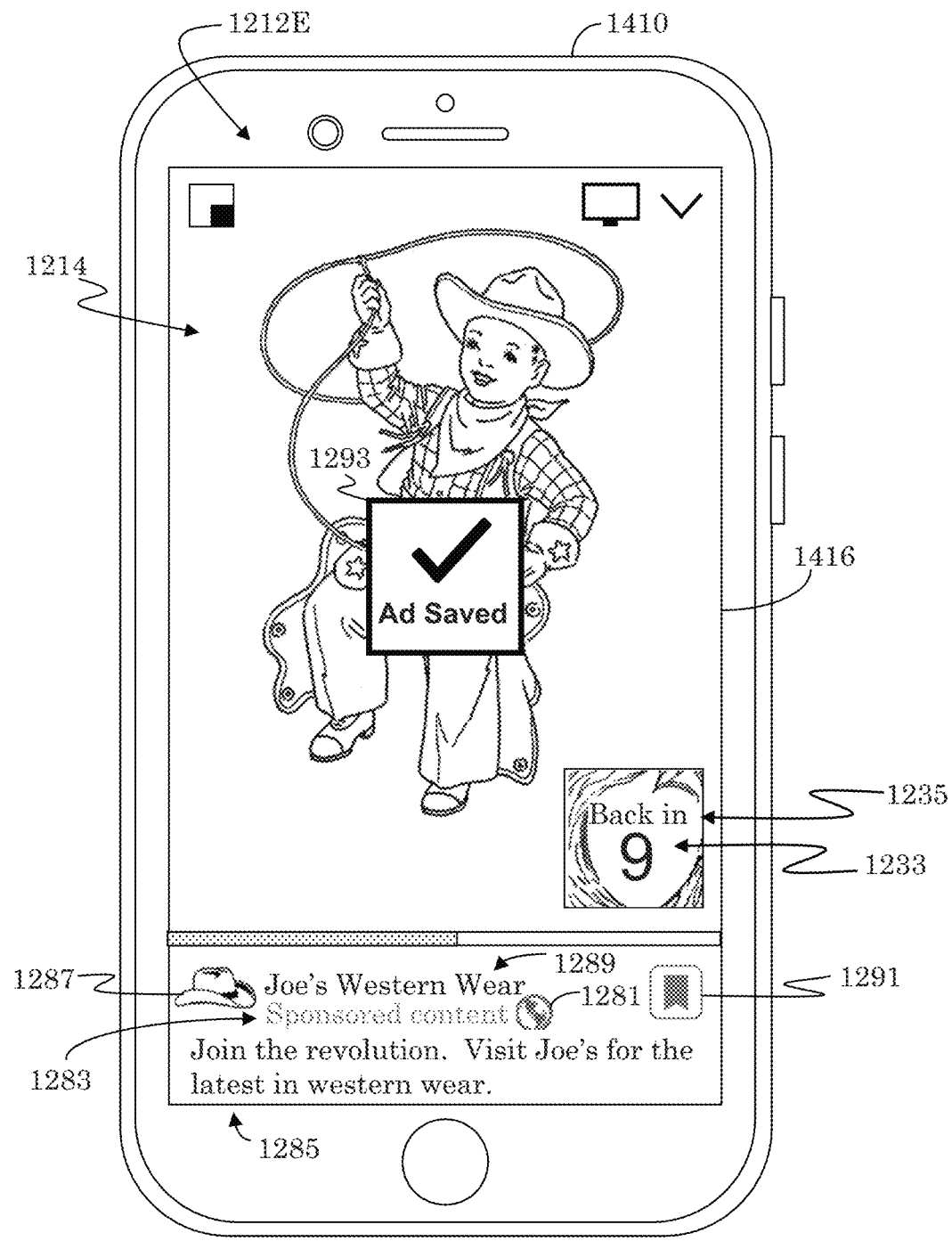
Figure 12F:
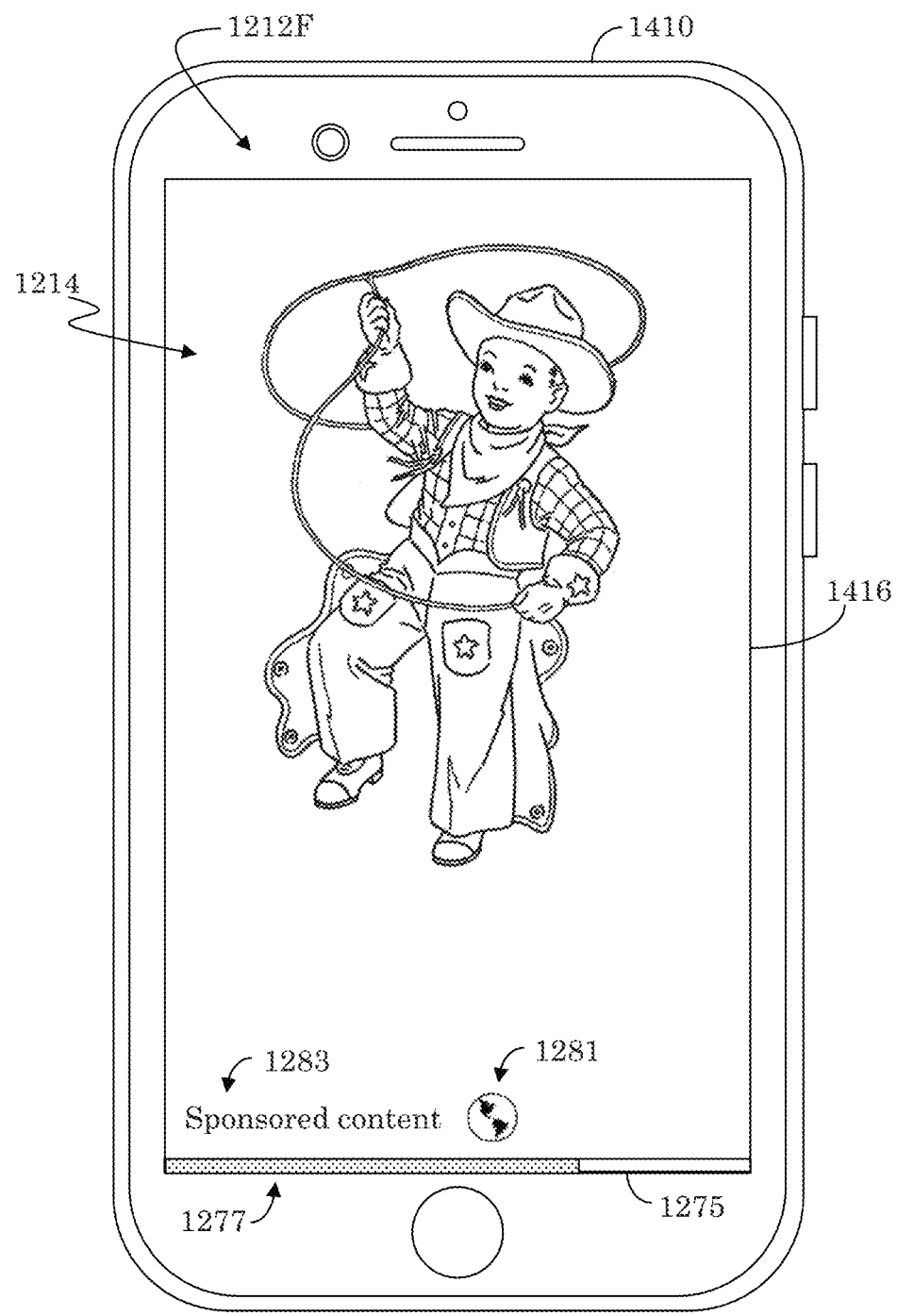

As shown in viewer interface 1212E of FIG. 12E a feedback indicator 1293 may be displayed in response to a second client user selecting option 1291. Afterwards, the viewer interface may return to the viewer interface 1212C of FIG. 12C, but with a current progress bar 1275 being displayed, as illustratively shown in viewer interface 1212F of FIG. 12F.

Figure 12G:
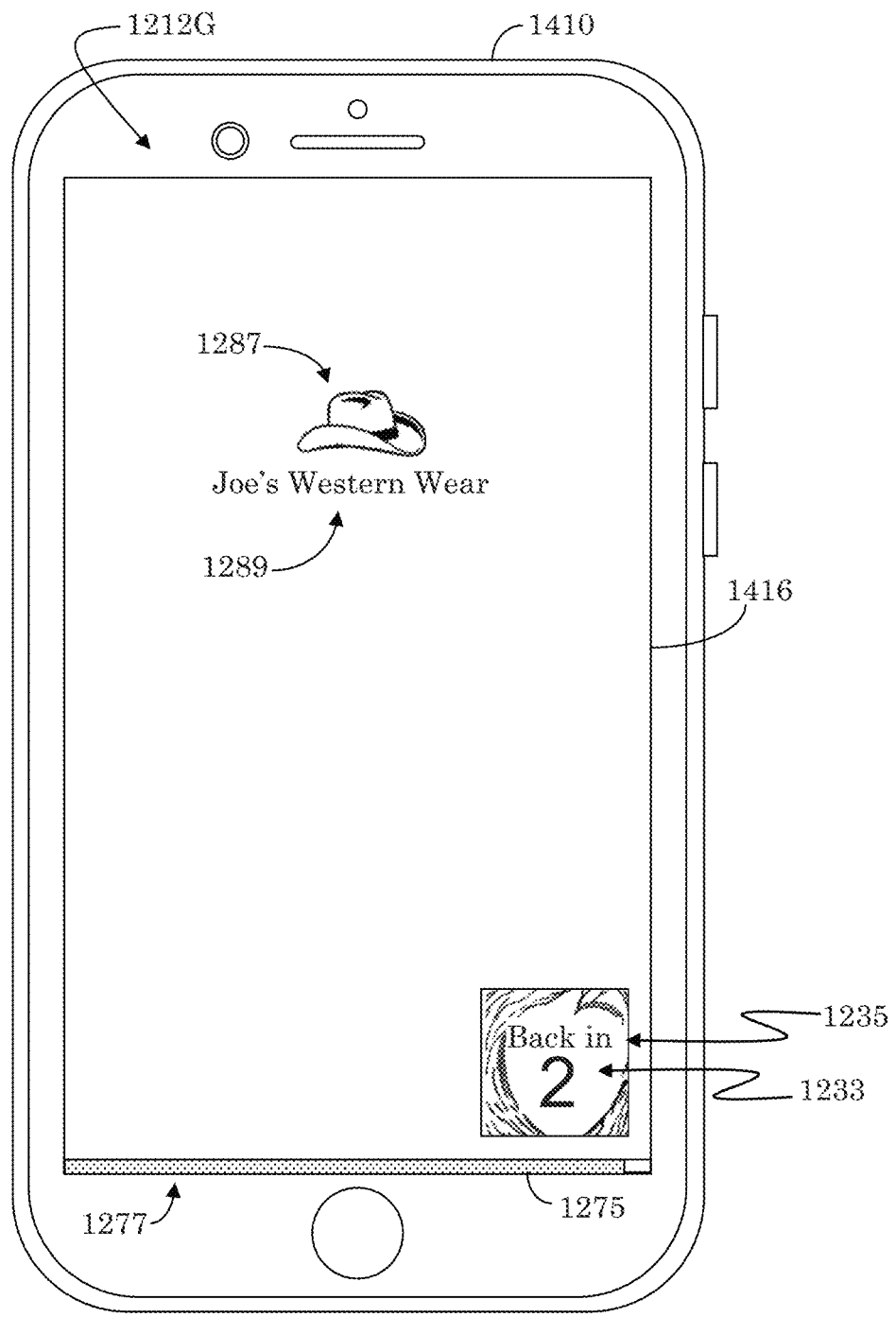

As illustrated in viewer interface 1212G of FIG. 12G, display of sponsored content item 1214 may be removed a predetermined time (e.g. a few seconds) prior to resuming the live video broadcast. In this case, the break timer 1233 and message 1235 may again be displayed to inform the second client user of the imminent resumption of broadcasting the live video. This establishes a warning period to alert the second client user to the resumption of broadcasting the live video. During this warning period, identification information (such as logo 1287 or name 1289) of the sponsor of the sponsored content item that just ended may be displayed. When break counter 1233, or progress bar 1275, indicates that the break time has ended, the viewer interface may return to viewer interface 1012 of FIG. 10 with resumption of receiving the broadcast of live video 914.

Figure 13:
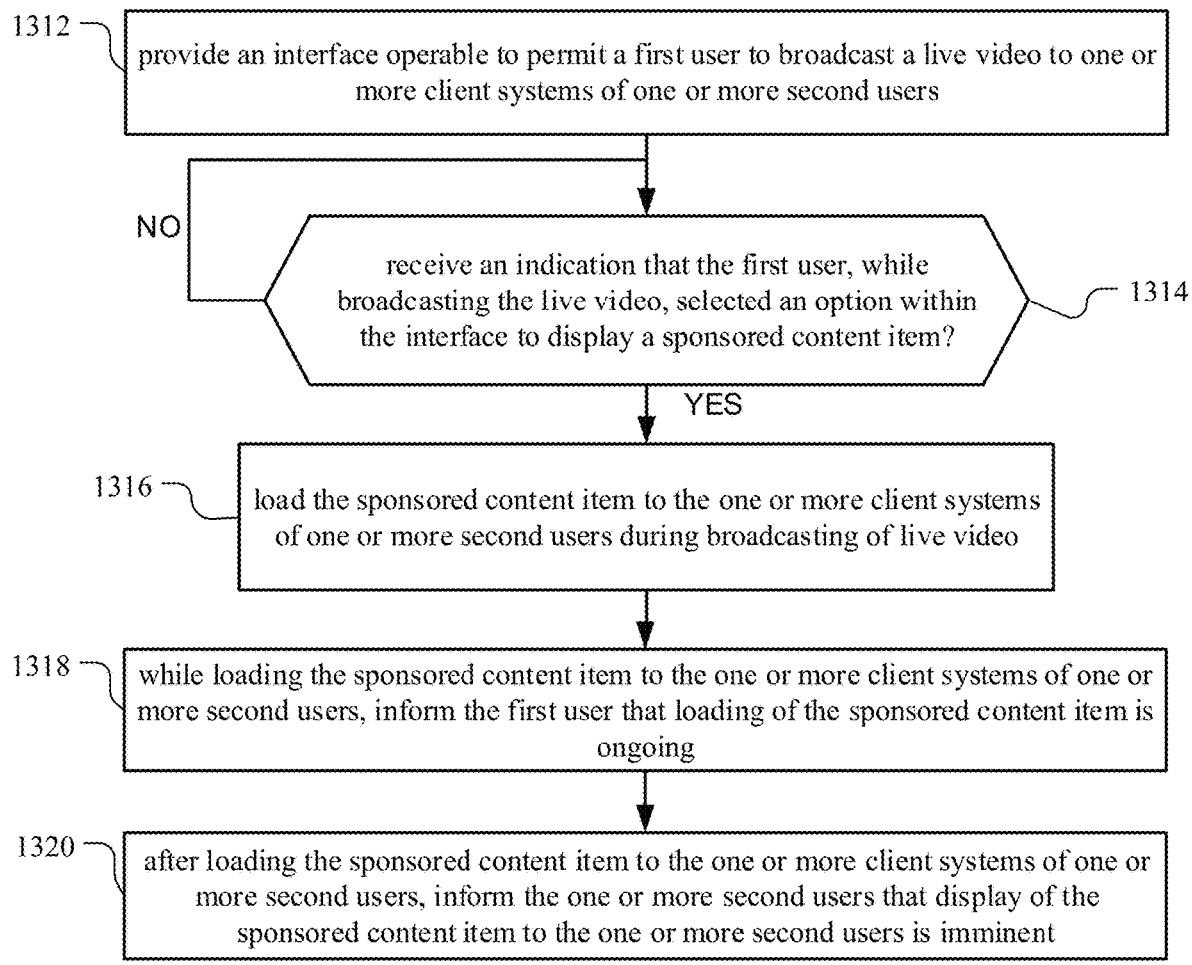
FIG. 13 illustrates an example method for preloading sponsored content items to multiple viewers during a live video broadcast for coincident displaying of the sponsored content items to the multiple viewers.

FIG. 13 illustrates an example method for preloading sponsored content items during a broadcast of a live video to assure coincident displaying of sponsored content items to multiple viewers. The method may begin at step 1312, where the server computing machine provides an interface operable to permit the first (client) user to broadcast a live video to one or more client systems of one or more second (client) users. In step 1314, the server computing machine responds to receiving an indication that the first user, while broadcasting the live video, selected an option within the interface to display a sponsored content item, by proceeding to step 1316, where the server computing machine starts loading the sponsored content item to the one or more client systems of one or more second users during the broadcasting of live video. At step 1318, while loading the sponsored content item to the one or more client systems of one or more second users, the server computing machine informs the first user that loading of the sponsored content item is ongoing even while the live video is still being broadcasted. At step 1320, after loading the sponsored content item to the one or more client systems of one or more second users, the server computing machine informs the one or more second users that display of the sponsored content item to the one or more second users is imminent.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order.

Sponsored-Content Item Stories for Live Media Items

As is explained above, the media item that a server computing machine sends to a client computing device (or client system) may be a pre-recorded or pre-generated media item (such as in the form of a newsfeed), or may be a live-stream (e.g. a live video broadcast). In the preceding example, the first client user pauses the live video broadcast while the second client users view a sponsored content item, which may include audio-and-video components. The following is a second example, wherein the first client user sends a sponsored content item to second client users (viewers) without interrupting the live video broadcast. In this case, the sent sponsored content item may consist of visual components only (e.g., images without sound). In this example, a server computing machine (e.g., a social-networking system 160) may again provide an interface operable to permit the first client user to broadcast a live video to one or more second client users. In response to the server computing machine receiving an indication that the first client user selected an option within the interface to display a sponsored content item while broadcasting the live video, the server computing machine (e.g., the social-networking system 160) may reduce the image size of the live video, and superimpose the live video of reduced size on the sponsored content item to define a combined image. Alternatively, in particular embodiments, the sponsored content item may be superimposed on the live video of reduced size. The combined image may have a sponsored portion on which the sponsored content item is displayed and a live portion on which the live video of reduced size is displayed. The server computing machine may then send the combined image for display to the one or more second client users (such as on client systems 130 of the one or more second client users), by which the second client users may simultaneously receive the sponsored content item and the broadcast of the live video.

Returning to FIG. 9B, in response to the first client user selecting the second type of sponsored content item 946 (indicating that the first client user wishes to send a sponsored content item to the second client users while also maintaining the broadcast of live video 914 active), the server computing machine reduces the image size of the live video 914 and superimposes the live video 914 of reduced size on the sponsored content item to define a combined image having a sponsored portion on which the sponsored content item is displayed and a live portion on which the live video of reduced size is displayed. The combined image is then sent for display to the second client users.

Figure 14A:
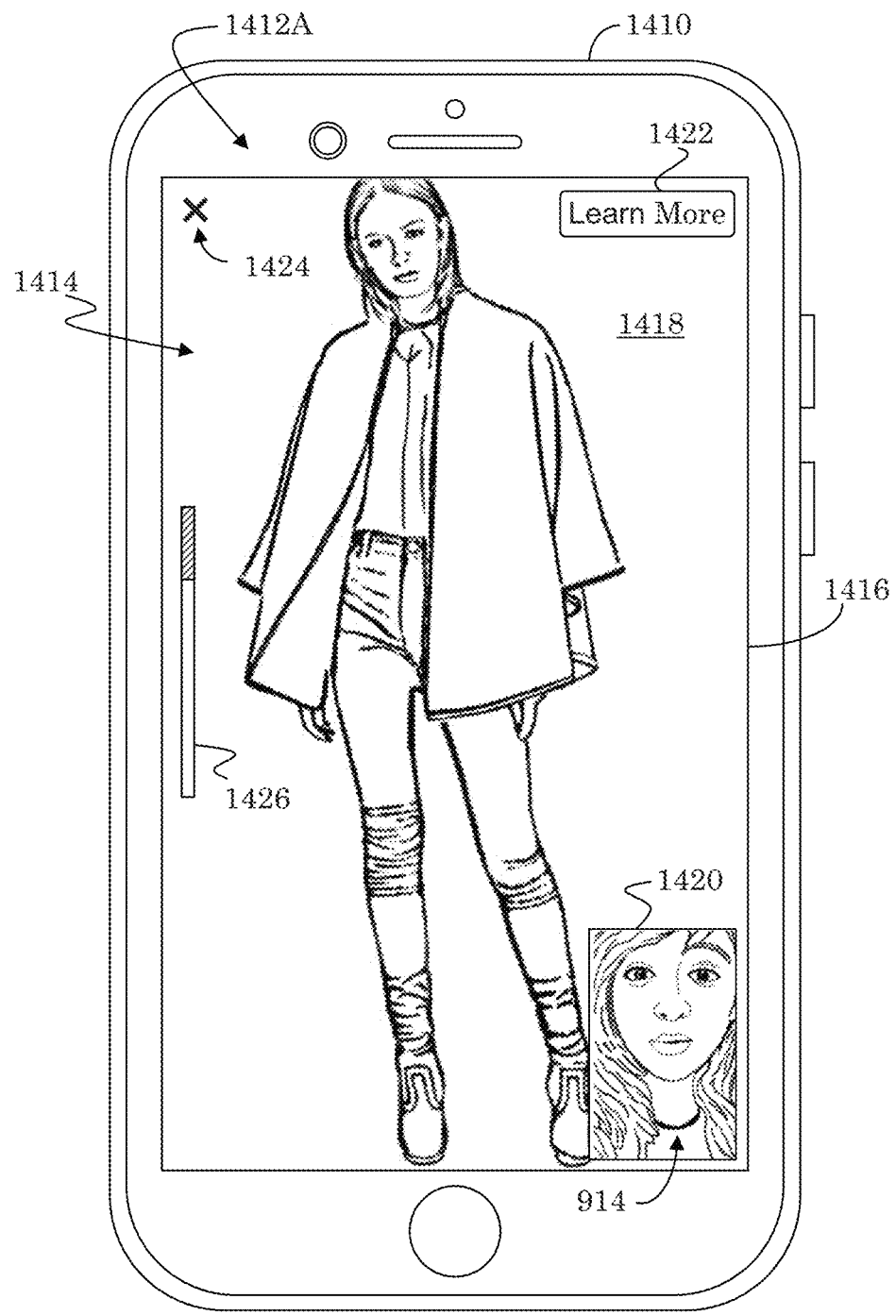
FIGS. 14A-14D illustrate various views of a viewer user interface that may be associated with rendering received live video broadcasts and received sponsored content items substantially simultaneously.

FIG. 14A Illustrates an example viewer interface 1412A of a second client user during the receiving of the combined image (i.e. during the simultaneously rendering of live video 914 and a sponsored content item 1414). As shown, viewer interface 1412A divides a screen area 1416 of the second client users' client system 1410 into the sponsored portion 1418, which displays the sponsored content item 1414, and the live portion 1420, which displays the live video 914.

Viewer interface 1412A permits the second client user to interact with both the sponsored portion 1418 and the live portion 1420. A Learn More option 1422 permits the second client user to obtain additional information (such as a website, promotion, contextual description, etc.) related to the sponsored content item being displayed. Alternatively, the second client user may choose to end the sponsored content item 1414 by selecting an end option 1424, and returning to a full-screen view of live video 914.

In particular embodiments, the second client user may switch among multiple different sponsored content items, while continuing to view live video 914. For example, viewer interface 1412A may provide an item indicator 1426 to keep track of different sponsored content items displayed in sponsored portion 1418.

Figure 14B:
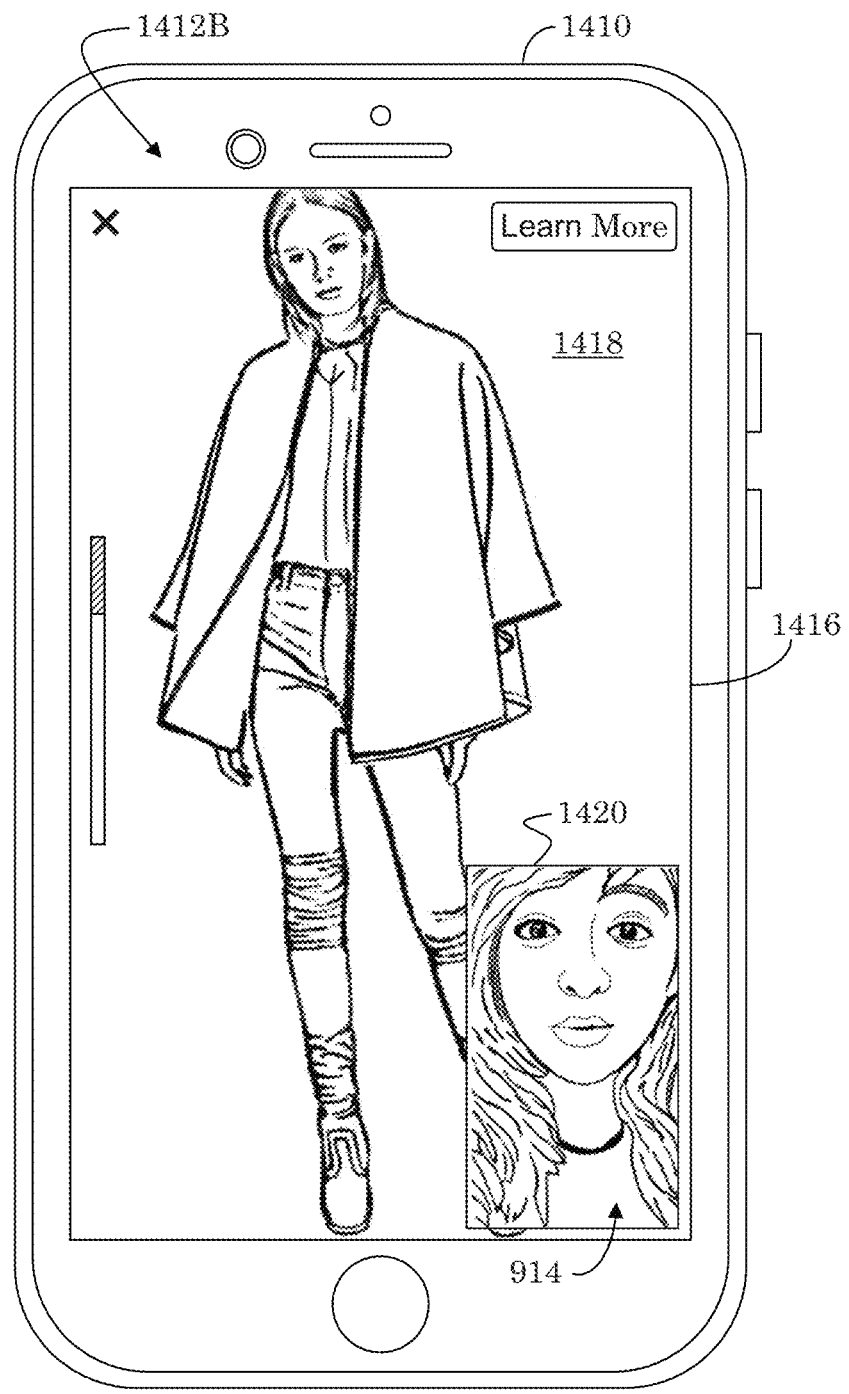

As is illustrated in FIG. 14B, in particular embodiments, the second client user may alter the size of live portion 1420. The client user may increase or decrease the size of live portion 1420 using any suitable method, such as by tapping on it, dragging a corner/side of it, etc.

Figure 14C:
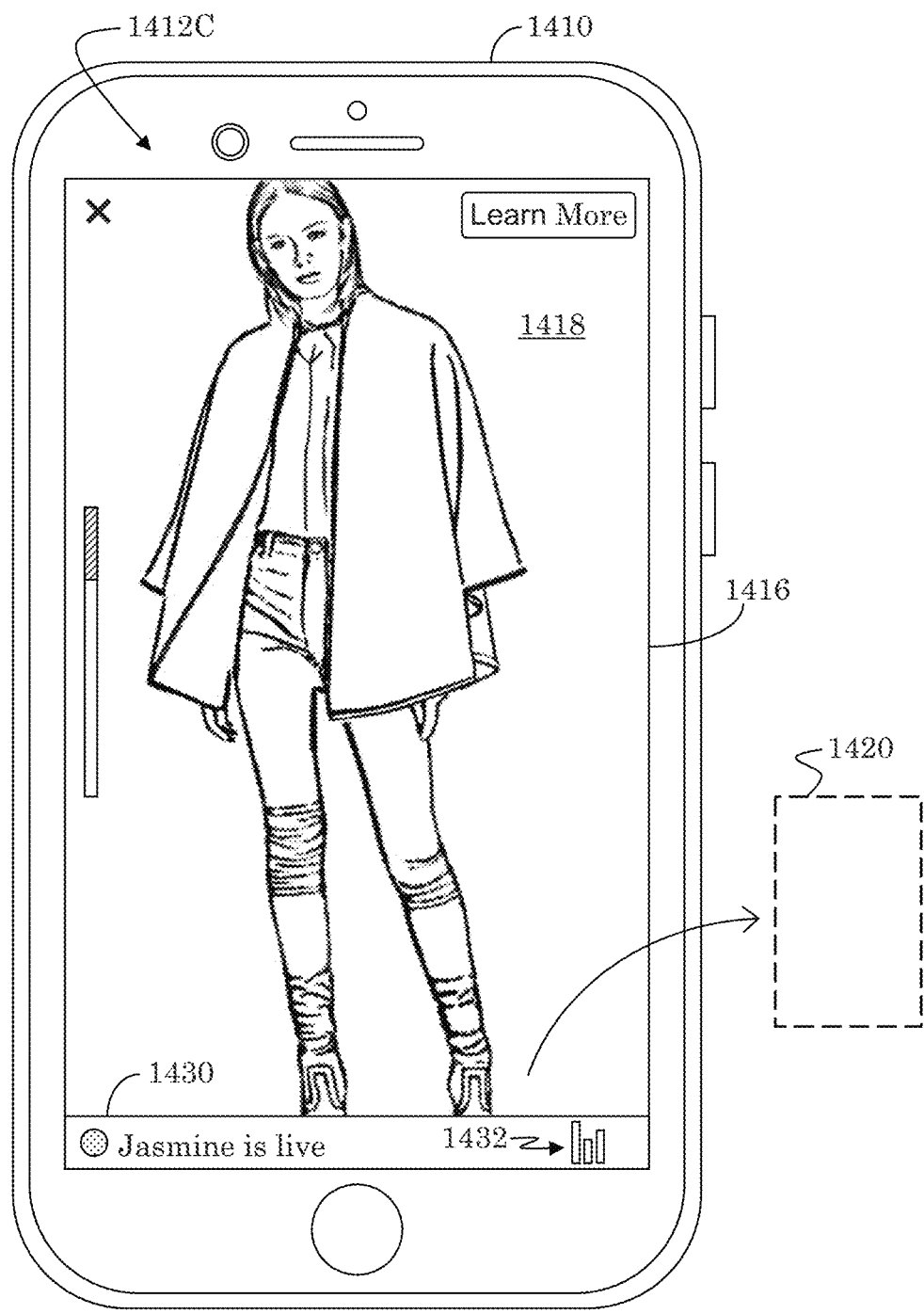

Alternatively, the second client user may choose to remove live portion 1420 of screen area 1416, and thereby obtain a larger view of the sponsored content item. As is illustrated in FIG. 14C, live portion 1420 may be removed by swiping it out of screen area 1416, or by any other suitable method such as tapping a predefined area of live portion 1420 or reducing the size of live portion 1420 below a predefined value. It is noted that live video 914 includes a live audio component, and that the server computing machine may continue to broadcast the live audio component to client system 1410 even after live portion 1420 is removed from screen area 1416. In some embodiments, in response to live portion 1420 being removed from screen area 1416, viewer interface 1412C may provide a broadcast indicator 1430 informing the second client user that the live video broadcast is still being received, even if the live image component of the live video 914 is not being displayed. Optionally, the broadcast indicator 1430 may provide an audio indicator 1432 informing the second client user that the live audio component of live video 914 continues to be received. Audio indicator 1432 may be a graphic of music equalizer sound bars.

Figure 14D:
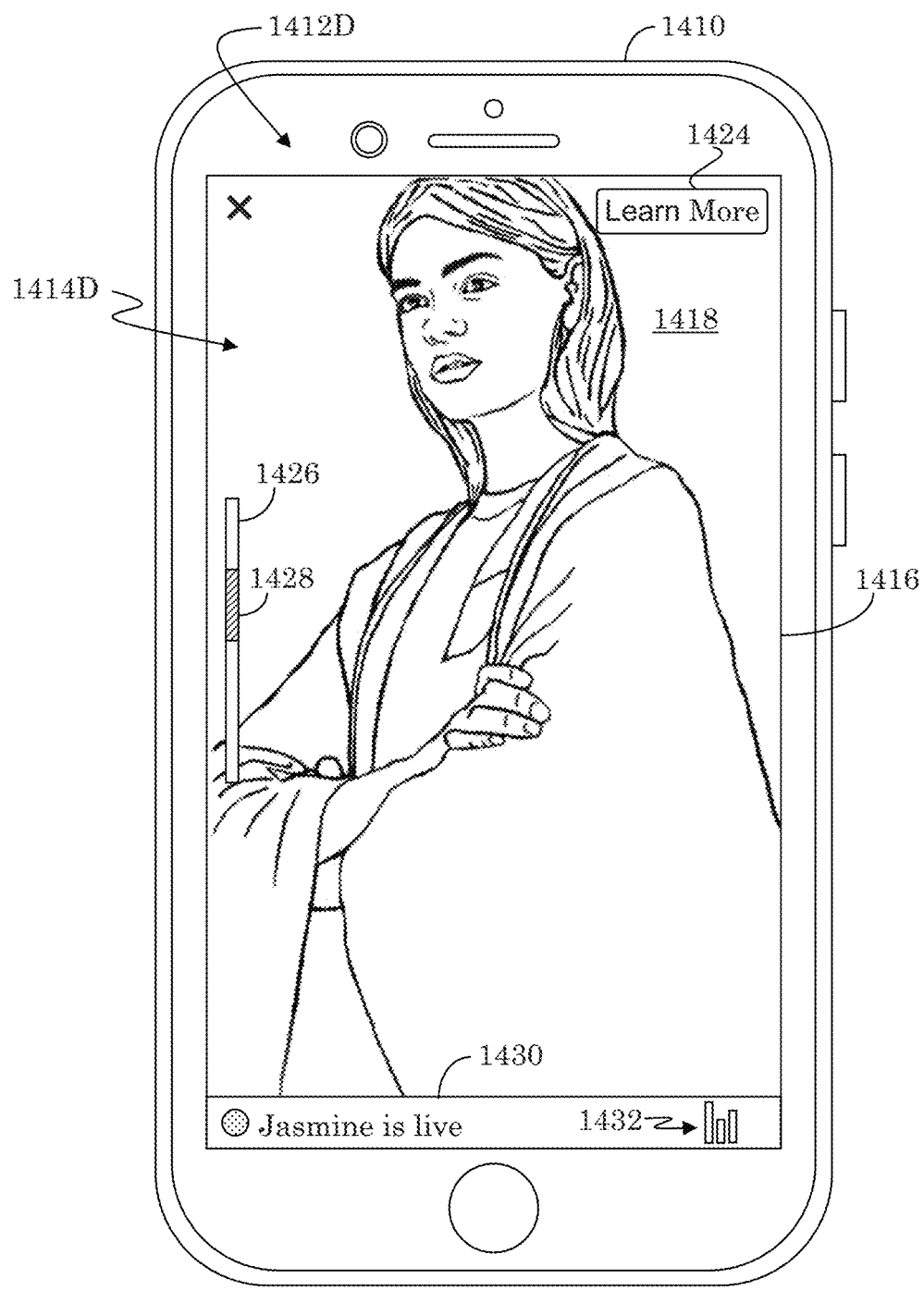

As stated above, in particular embodiments, the second client user may switch among multiple different sponsored content items. This may be achieved, for example by swiping across a predefined portion of sponsored portion 1418. FIG. 14D illustrates viewer interface 1412D following a change of sponsored content item from the example of FIG. 14C. As shown, a different sponsored content item 1414D is displayed within sponsored portion 1418. Additionally, a darken area 1428 of item indicator 1426 is progressed downward to indicate the transition from sponsored content item 1414 of FIG. 14C to the sponsored content item 1414D of FIG. 14D.

Figure 15A:
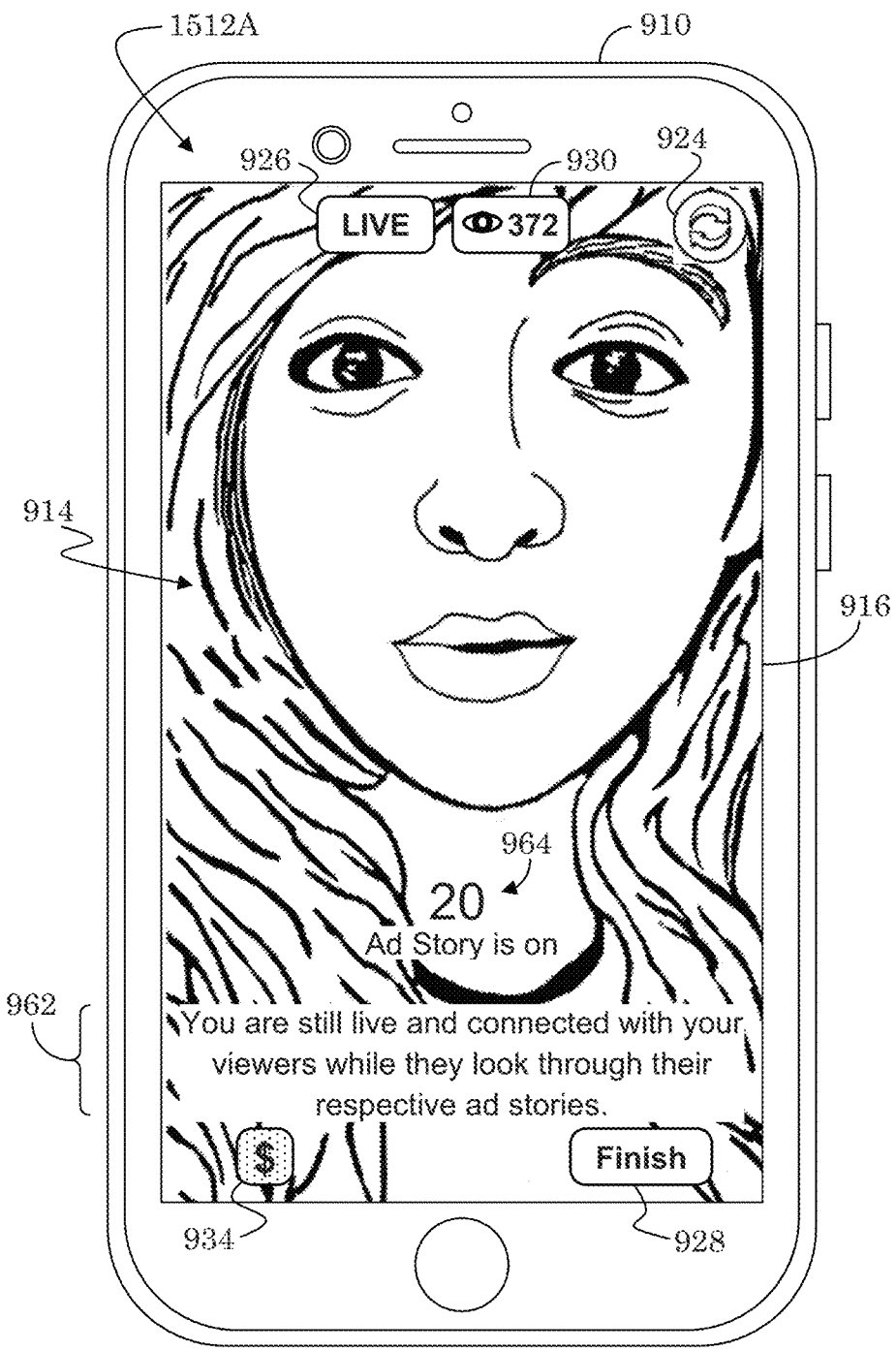
FIGS. 15A-15B illustrate views of a broadcaster interface that may be associated with rendering received live video broadcasts and received sponsored content items substantially simultaneously.

Returning to FIG. 9B, in response to the first client user selecting the second type of sponsored content item 946, the broadcaster interface 912B may transition to broadcaster interface 1512A illustrated in FIG. 15A. Optionally, broadcaster interface 1512A alters sponsored option 934, such as by darkening it, to indicate that it has already been selected. Additionally, a message 962 may be provided informing the first client user that the broadcast of live video 914 is still active while the second client users view their respective sponsored content items. Optionally, a counter 964 may be provided to indicate how many second client users are still actively viewing their respective sponsored content items. Alternatively, if the display of sponsored content items has a time duration limit, then counter 964 may provide a count-down timer to the end of the sponsored content items.

Additionally, the first client user may choose to end the transmission of sponsored content items by selecting finish option 928. For example, if viewer count 930 indicates a drastic reduction of viewers during the providing of a sponsored content item, the first client user may choose to end the providing of the sponsored content item early, and thereby avoid losing more viewers. Optionally, finish option 928 may initially be inactive, and become active only after a predefined duration of time following the start of a sponsored content item.

Figure 15B:
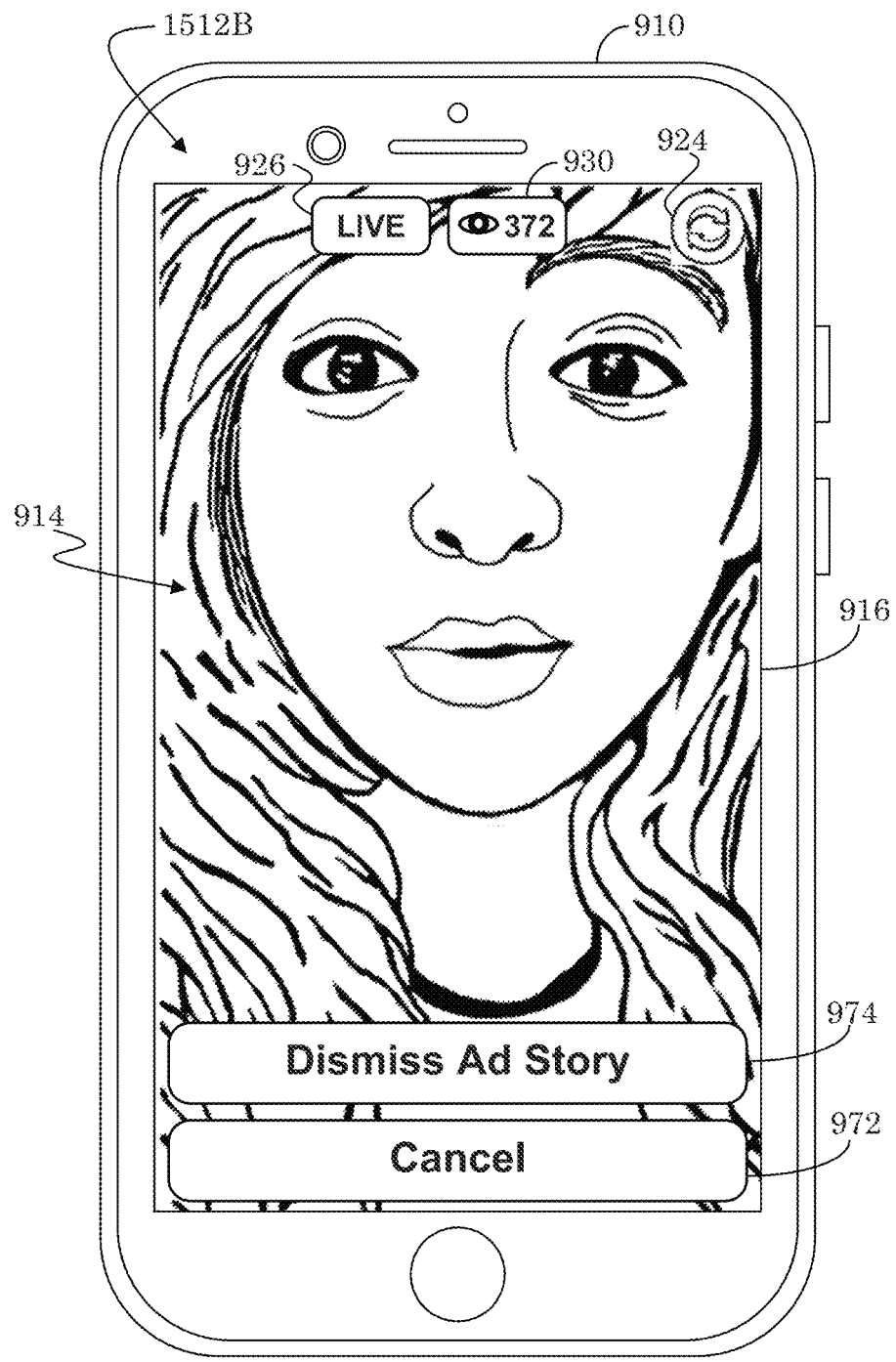

FIG. 15B illustrates an optional broadcaster interface 1512B that may be displayed in response to the first client user selecting the finish option 928. In the present case, the first client user may be presented with a cancel option 972 to avoid terminating the sponsored content item and return to the broadcaster interface 1512A of FIG. 15A. Alternatively, a confirmation option 974 permits the first client user to confirm the termination of the sponsored content items being sent to the second client users.

Figure 16:
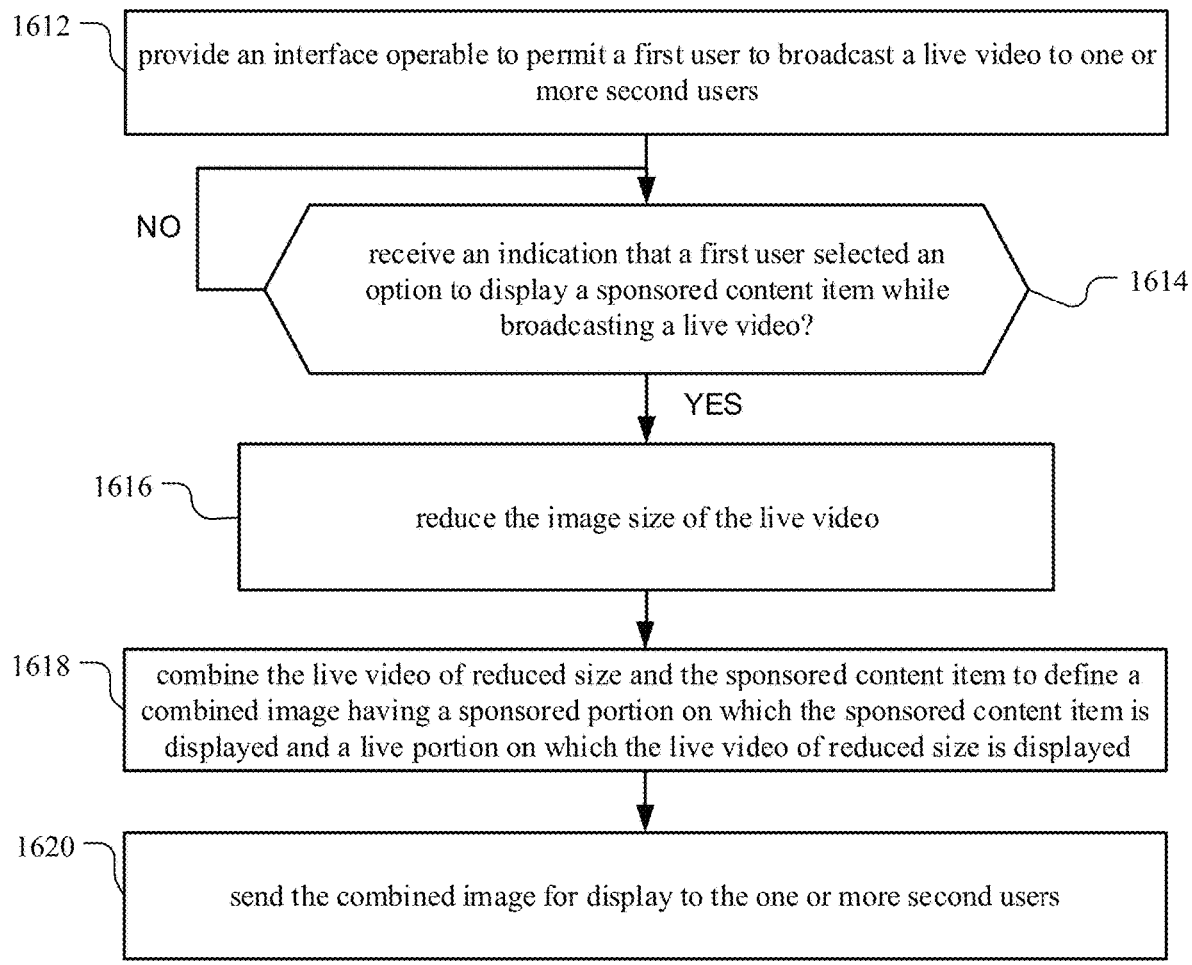
FIG. 16 illustrates an example method for providing sponsored content items during live videos without interrupting the live videos.

FIG. 16 illustrates an example method for providing sponsored content items during live videos without interrupting the live videos. The method may begin at step 1612, where the server computing machine provides an interface operable to permit the first (client) user to broadcast a live video to one or more second (client) users. In step 1614, the server computing machine responds to receiving an indication that a first user selected an option to display a sponsored content item, by proceeding to step 1616, where the image size of the live video is reduced. At step 1618, the live video of reduced size is combined with the sponsored content item to define a combined image having a sponsored portion on which the sponsored content item is displayed, and a live portion on which the live video of reduced size is displayed. At step 1620, the combined image is sent for display to the one or more second (client) users.

Particular embodiments may repeat one or more steps of the method of FIG. 16, where appropriate. Although this disclosure describes and illustrates particular steps of the method of FIG. 16 as occurring in a particular order, this disclosure contemplates any suitable steps of the method of FIG. 16 occurring in any suitable order.

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, an advertisement (or a sponsored content item) may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a newsfeed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 17:
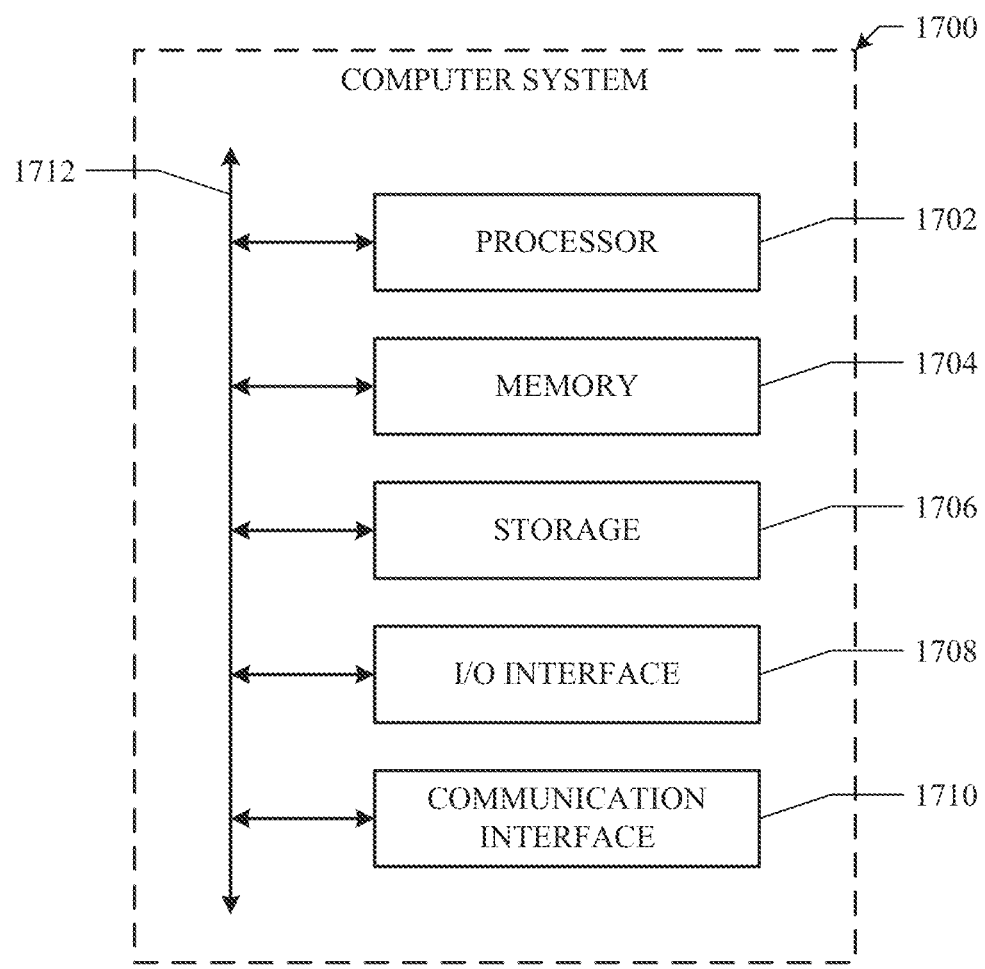
FIG. 17 illustrates an example computer system.

FIG. 17 illustrates an example computer system 1700. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method, comprising:
by one or more computing devices, providing, across one or more communications networks, an interface for display in a first client device, the interface operable to permit a first user to broadcast a live video to one or more second users;
by the one or more computing devices, determining that at least one predetermined condition for displaying a sponsored content item during the broadcast of the live video has been met, the at least one predetermined condition comprising an elapse of a minimum amount of time since the broadcast of the live video began;
by the one or more computing devices, in response to the determination that the at least one predetermined condition has been met, displaying within the interface an option operable to begin displaying the sponsored content item to the one or more second users;
by the one or more computing devices, receiving, across the one or more communications networks from the first client device, an indication that the first user selected the option within the interface while broadcasting the live video;
by the one or more computing devices, reducing an image size of the live video in response to receiving the indication;
by the one or more computing devices, combining the live video of reduced size and the sponsored content item to define a combined image having a sponsored portion on which the sponsored content item is displayed and a live portion on which the live video of reduced size is displayed; and
by the one or more computing devices, sending, across the one or more communications networks, the combined image for display in one or more second client devices of the one or more second users.

2. The method of claim 1, wherein the sponsored portion of the combined image is responsive to interactions from the one or more second users.

3. The method of claim 1, wherein in response to an indication from the one or more second users indicating a desire to change the sponsored content item, the sponsored content item is replaced by a second sponsored content item in the sponsored portion of the combined image.

4. The method of claim 1, wherein a size of the live portion of the combined image is altered in response to a size-change indication from the one or more second users.

5. The method of claim 1, wherein:
the live video includes live audio; and
in response to an indication from the one or more second users indicating a desire to remove the live portion from the combined image, the live portion is removed from the combined image while the live audio continues to be sent to the one or more second users.

6. The method of claim 5, wherein while the live portion is removed from the combined image, a message indicating that the broadcast of the live video is ongoing is displayed to the one or more second users.

7. The method of claim 1, further comprising by the one or more computing devices:

in response to receiving an indication from the one or more second users indicating a desire for removal of the sponsored content item, removing the sponsored content from the combined image after an elapse of a predefined time period following an initiation of sending the combined image to the one or more second users.

8. The method of claim 1, further comprising a plurality of the second users, wherein a respective combined image having an individually customized sponsored content item is sent to each of the second users.

9. The method of claim 8, wherein each of the second users independently interacts with its respective combined image.

10. The method of claim 1, wherein the at least one predetermined condition further comprises one or more of:
an elapse of a minimum amount of time since a previous sponsored content item was presented,
a number of followers of the first user exceeding a minimum number of followers, or
a number of viewers of the broadcast of the live video exceeding a minimum number of viewers.

11. The method of claim 1, further comprising:
by the one or more computing devices, in response to receiving an indication that the first user selected the option to display the sponsored content while broadcasting the live video, loading the sponsored content to one or more client systems of the one or more second users; and
after the sponsored content is loaded to the one or more second users, displaying the sponsored content to the one or more second users, and ceasing to display the live video to the client systems of the one or more second users while the sponsored content is displaying to the one or more second users.

12. The method of claim 1, wherein combining the live video of reduced size and the sponsored content item comprises superimposing the live video of reduced size on the sponsored content item.

13. One or more computer-readable non-transitory storage media embodying computer executable instructions that when executed by a processor causes the processor to:
provide, across one or more communications networks, an interface for display in a first client device, the interface operable to permit a first user to broadcast a live video to one or more second users;
determine that at least one predetermined condition for displaying a sponsored content item during the broadcast of the live video has been met the at least one predetermined condition comprising an elapse of a minimum amount of time since the broadcast of the live video began;
in response to the determination that the at least one predetermined condition has been met, display within the interface an option operable to begin displaying the sponsored content item to the one or more second users;
receive, across the one or more communications networks from the first client device, an indication that the first user selected the option within the interface while broadcasting the live video;
reduce an image size of the live video in response to receiving the indication;
combine the live video of reduced size and the sponsored content item to define a combined image having a sponsored portion on which the sponsored content item is displayed and a live portion on which the live video of reduced size is displayed; and
send, across the one or more communications networks, the combined image for display in one or more second client devices of the one or more second users.

14. The media of claim 13, wherein in response to an indication from the one or more second users indicating a desire to change the sponsored content item, the sponsored content item is replaced by a second sponsored content item in the sponsored portion of the combined image.

15. The media of claim 13, wherein
the live video includes live audio; and
in response to an indication from the one or more second users indicating a desire to remove the live portion from the combined image, the live portion is removed from the combined image while the live audio continues to be sent to the one or more second users.

16. The media of claim 13, wherein the one or more computer-readable non-transitory storage media embodying software is further operable when executed to:
in response to receiving an indication that the first user selected the option to display the sponsored content while broadcasting the live video, load the sponsored content to the one or more second users; and
after the sponsored content is loaded to the one or more second users, display the sponsored content to the one or more second users, and ceasing to display the live video to the one or more second users while the sponsored content is displaying to the one or more second users.

17. A system comprising:
one or more processors; and
a memory coupled to the one or more processors, the memory comprising instructions executable by the one or more processors, the one or more processors being operable when executing the instructions to:
provide, across one or more communications networks, an interface for display in a first client device, the interface operable to permit a first user to broadcast a live video to one or more second users;
determine that at least one predetermined condition for displaying a sponsored content item during the broadcast of the live video has been met, the at least one predetermined condition comprising an elapse of a minimum amount of time since the broadcast of the live video began;
in response to the determination that the at least one predetermined condition has been met, display within the interface an option operable to begin displaying the sponsored content item to the one or more second users;
receive, across the one or more communications networks from the first client device, an indication that the first user selected the option within the interface while broadcasting the live video;
reduce an image size of the live video in response to receiving the indication;
combine the live video of reduced size and the sponsored content item to define a combined image having a sponsored portion on which the sponsored content item is displayed and a live portion on which the live video of reduced size is displayed; and
send, across the one or more communications networks, the combined image for display in one or more second client devices of the one or more second users.

18. The system of claim 17, wherein in response to an indication from the one or more second users indicating a desire to change the sponsored content item, the sponsored content item is replaced by a second sponsored content item in the sponsored portion of the combined image.

\* \* \* \* \*